(12) United States Patent
Suzuki et al.

(10) Patent No.: US 8,952,993 B2
(45) Date of Patent: Feb. 10, 2015

(54) INFORMATION PROCESSING APPARATUS, METHOD, AND PROGRAM

(71) Applicant: Sony Corporation, Tokyo (JP)

(72) Inventors: Takaharu Suzuki, Tokyo (JP); Kazuyuki Yamamoto, Kanagawa (JP); Hidetoshi Kabasawa, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/185,187

(22) Filed: Feb. 20, 2014

(65) Prior Publication Data

US 2014/0168275 A1  Jun. 19, 2014

Related U.S. Application Data

(63) Continuation of application No. 12/758,104, filed on Apr. 12, 2010, now Pat. No. 8,698,846.

(30) Foreign Application Priority Data

Apr. 22, 2009  (JP) .................. 2009-103828

(51) Int. Cl.
*G09G 5/00* (2006.01)
*G06K 9/32* (2006.01)
*A63F 9/24* (2006.01)
(Continued)

(52) U.S. Cl.
CPC ............ *G09G 5/373* (2013.01); *G06F 3/017* (2013.01); *G06F 3/0346* (2013.01); *G06F 3/0481* (2013.01); *G09G 5/003* (2013.01); *G06F 3/14* (2013.01); *G06F 2203/04806* (2013.01); *G09G 2340/0407* (2013.01); *G09G 2340/045* (2013.01); *G09G 2370/027* (2013.01); *G09G 2370/16* (2013.01)

USPC ........... 345/667; 345/660; 345/666; 382/298; 463/30; 463/31; 463/37; 715/765; 715/788; 715/801; 715/863

(58) Field of Classification Search
USPC ................ 345/581, 619, 660–671, 467–472, 345/472.1–472.3; 382/298–301; 715/764, 715/765, 781, 788, 800, 801, 848–852, 715/863; 463/30–39
See application file for complete search history.

(56) References Cited

U.S. PATENT DOCUMENTS

| 6,625,328 B2 | 9/2003 | King |
| 2004/0057634 A1 | 3/2004 | Mutoh |
| 2005/0195216 A1 | 9/2005 | Kramer et al. |
| 2005/0248655 A1 | 11/2005 | Kitamura et al. |
| 2007/0226646 A1 | 9/2007 | Nagiyama et al. |
| 2007/0248281 A1* | 10/2007 | Super et al. .................. 382/275 |

(Continued)

FOREIGN PATENT DOCUMENTS

JP  2006-260021 A  9/2009

*Primary Examiner* — Wesner Sajous
*Assistant Examiner* — Andrew Shin
(74) *Attorney, Agent, or Firm* — Wolf, Greenfield & Sacks, P.C.

(57) ABSTRACT

An information processing apparatus includes a designation unit which designates an object, a sensing unit which senses a change which exceeds a threshold value in at least a part of the object when a user zooms in on the object, and a zoom unit which zooms in on the object at the zoom rate which is just less than that when there is a change that exceeds the threshold value in at least a part of the object if there is a change that exceeds the threshold value in at least a part of the object when the user zooms in on the object at the designated zoom rate, and which zooms in on the object if there is no change that exceeds the threshold value in at least a part of the object even when the user zooms in on the object at the designated zoom rate.

20 Claims, 21 Drawing Sheets

(51) Int. Cl.
  *G06F 3/048* (2013.01)
  *G06F 3/033* (2013.01)
  *G09G 5/373* (2006.01)
  *G06F 3/01* (2006.01)
  *G06F 3/0346* (2013.01)
  *G06F 3/0481* (2013.01)
  *G06F 3/14* (2006.01)

(56) References Cited

U.S. PATENT DOCUMENTS

| 2008/0158377 | A1 | 7/2008 | Chanas et al. |
| 2008/0309777 | A1 | 12/2008 | Aoyama |
| 2009/0097833 | A1 | 4/2009 | Imada |
| 2009/0322676 | A1 | 12/2009 | Kerr et al. |
| 2010/0271400 | A1 | 10/2010 | Suzuki et al. |

* cited by examiner

FIG. 25

CHANNEL 10
PROGRAM INFORMATION
AT FOUR

301(P₄₁)

INFORMATION PROCESSING APPARATUS, METHOD, AND PROGRAM

RELATED APPLICATIONS

This application is a continuation of U.S. patent application Ser. No. 12/758,104, entitled "INFORMATION PROCESSING APPARATUS, METHOD AND PROGRAM," filed Apr. 12, 2010, which claims priority to Japanese Patent Application No. 2009-103828, filed Apr. 22, 2009. Each of the documents listed above is incorporated herein by reference in its entirety.

BACKGROUND OF THE INVENTION

1. Field of the Invention

The present invention relates to an information processing apparatus, method, and a program. In particular, the present invention relates to an information processing apparatus and method, and a program which make it possible to quickly zoom in on an object.

2. Description of the Related Art

Recently, personal computers have spread, and many users use personal computers. Users can enjoy various kinds of information through the Internet by using personal computers.

Various kinds of information can be displayed on a display. In the case of a touch panel type display, a manipulation screen is displayed, and by selectively manipulating a specified button on the manipulation screen, a user can execute a function allocated to the button.

However, a display for displaying information may have various sizes. If a manipulation screen, which is adopted to be displayed on a large display, is displayed on a small display with the same layout, the buttons on the manipulation screen becomes small. If the button is too small in comparison to a finger, it is difficult for a user to accurately select and manipulate a desired button.

Accordingly, Japanese Unexamined Patent Application Publication No. 2006-260021 discloses that a lower limit value of the button size is predetermined in order to prevent the buttons from becoming too small so that it is difficult for a user to manipulate the buttons with his/her finger. That is, in the case of a small display, as the size of the button is below the lower limit value, the layout of the manipulation screen is changed to be different from that of a large display.

As described above, even if the lower limit is predetermined, it may not cope with diverse users' tastes. That is, in general, the size of the display of a device that a user uses is fixed and thus is not changed. As a result, according to the previous proposals, the button size is maintained to be constant to a user.

SUMMARY OF THE INVENTION

However, tastes for the size of an object that is represented by a button may differ for each user. Since an aged person wants to enlarge characters that are displayed on the object, he/she is apt to like large-sized buttons. In contrast, a young person is apt to like small objects in a state in which characters and objects are displayed with a good balance rather than the size of the characters. Accordingly, in order to change the size of an object to suit a user's taste, installing of a zoom function to enlarge or reduce the size of the object is often used.

However, if a user zooms in on the object at an arbitrary zoom rate, it may be difficult for the user to visually recognize information that is displayed on the object. Accordingly, the user may repeat manipulations for zooming while setting the predetermined zoom rate and for confirming whether the information can be visually recognized. Consequently, it may take time to set a proper zoom rate and to zoom in on the object at the set zoom rate.

In view of the above situation, it is desirable to make it possible to quickly zoom in on an object.

According to an embodiment of the present invention, there is provided an information processing apparatus including: a designation unit which designates an object; a sensing unit which senses the occurrence of a change, which exceeds a threshold value in at least a part of the object when the user zooms in on the object at a zoom rate designated by a user; and a zoom unit which zooms in on the object at the zoom rate which is just less than that when there is a change that exceeds the threshold value in at least a part of the object if there is a change that exceeds the threshold value in at least a part of the object when user zooms in on the object at the designated zoom rate, and which zooms in on the object at the designated zoom rate if there is no change that exceeds the threshold value in at least a part of the object even when the user zooms in on the object at the designated zoom rate.

In the image processing apparatus according to the embodiment of the present invention, the zoom rate is designated by a remote control signal generated when an input device is manipulated using gestures in a three-dimensional (3D) space.

In the image processing apparatus according to the embodiment of the present invention, the change, which exceeds the threshold value in at least a part of the object, can blur or make a mosaic pattern of the object.

In the image processing apparatus according to the embodiment of the present invention, the zoom rate, which is just less than that when the object is blurred or made into a mosaic pattern, is set by recognizing a character, a figure, or a face that is displayed on the object.

The image processing apparatus according to the embodiment of the present invention may further include a detection unit which detects the gesture manipulation of the input device; and an operation unit which operates the zoom rate on the basis of the detected gesture manipulation.

In the image processing apparatus according to the embodiment of the present invention, if a reference point to be zoomed on the object is designated, the zoom unit zooms in on a predetermined range on the basis of a virtual point on a virtual plane to which the reference point corresponds.

In the image processing apparatus according to the embodiment of the present invention, if end portions in the upward, downward, left, and right directions of an enlarged range are positioned out of the virtual plane when the predetermined range around the virtual point is enlarged, the position of the virtual point in the virtual plane is corrected so that an image in the virtual plane is enlarged.

According to another embodiment of the present invention, there is provided an information processing method including the steps of: providing a designation unit, a sensing unit, and a zoom unit; designating an object by the designation unit; sensing by the sensing unit, a change which exceeds a threshold value in at least a part of the object when the user zooms in on the object at a zoom rate designated by a user; and zooming in on the object using the zoom unit at the zoom rate which is just less than that when there is a change that exceeds the threshold value occurs in at least a part of the object if there is a change that exceeds the threshold value in at least a part of the object when the user zooms in on the object at the designated zoom rate, and zooming in on the object by the zoom unit at the designated zoom rate if there is no change that exceeds the threshold value does not occur in at least a part of the object even when the user zooms in on the object at the designated zoom rate.

According to still another embodiment of the present invention, there is provided a program prompting a computer to function as: designation means for designating an object; sensing means for sensing a change which exceeds a threshold value in at least a part of the object when the user zooms in on the object at a zoom rate designated by a user; and zoom means for zooming in on the object at the zoom rate which is just less than that when there is a change that exceeds the threshold value in at least a part of the object if there is a change that exceeds the threshold value in at least a part of the object when the user zooms in on the object at the designated zoom rate, and zooming in on the object at the designated zoom rate if there is no change that exceeds the threshold value in at least a part of the object even when the user zooms in on the object at the designated zoom rate.

According to the embodiment of the present invention, a designation unit or designation means designates an object, and a sensing unit or sensing means senses a change, which exceeds a threshold value in at least a part of the object when the user zooms in on the object at a zoom rate designated by a user. A zoom unit or zoom means zooms, if the change that exceeds the threshold value occurs in at least a part of the object when the user zooms in on the object at the designated zoom rate, in on the object at the zoom rate which is just less than that when there is a change that exceeds the threshold value in at least a part of the object or zooms, if there is no change that exceeds the threshold value in at least a part of the object even when the user zooms in on the object at the designated zoom rate, in on the object at the designated zoom rate.

As described above, according to the embodiment of the present invention, an object can be quickly zoomed.

BRIEF DESCRIPTION OF THE DRAWINGS

FIG. 25 is a diagram illustrating a display example;

DESCRIPTION OF THE PREFERRED EMBODIMENTS

Hereinafter, best modes (hereinafter, referred to as embodiments) for carrying out the present invention will be described. In addition, the explanation will be made in the following order.

Figure 1:
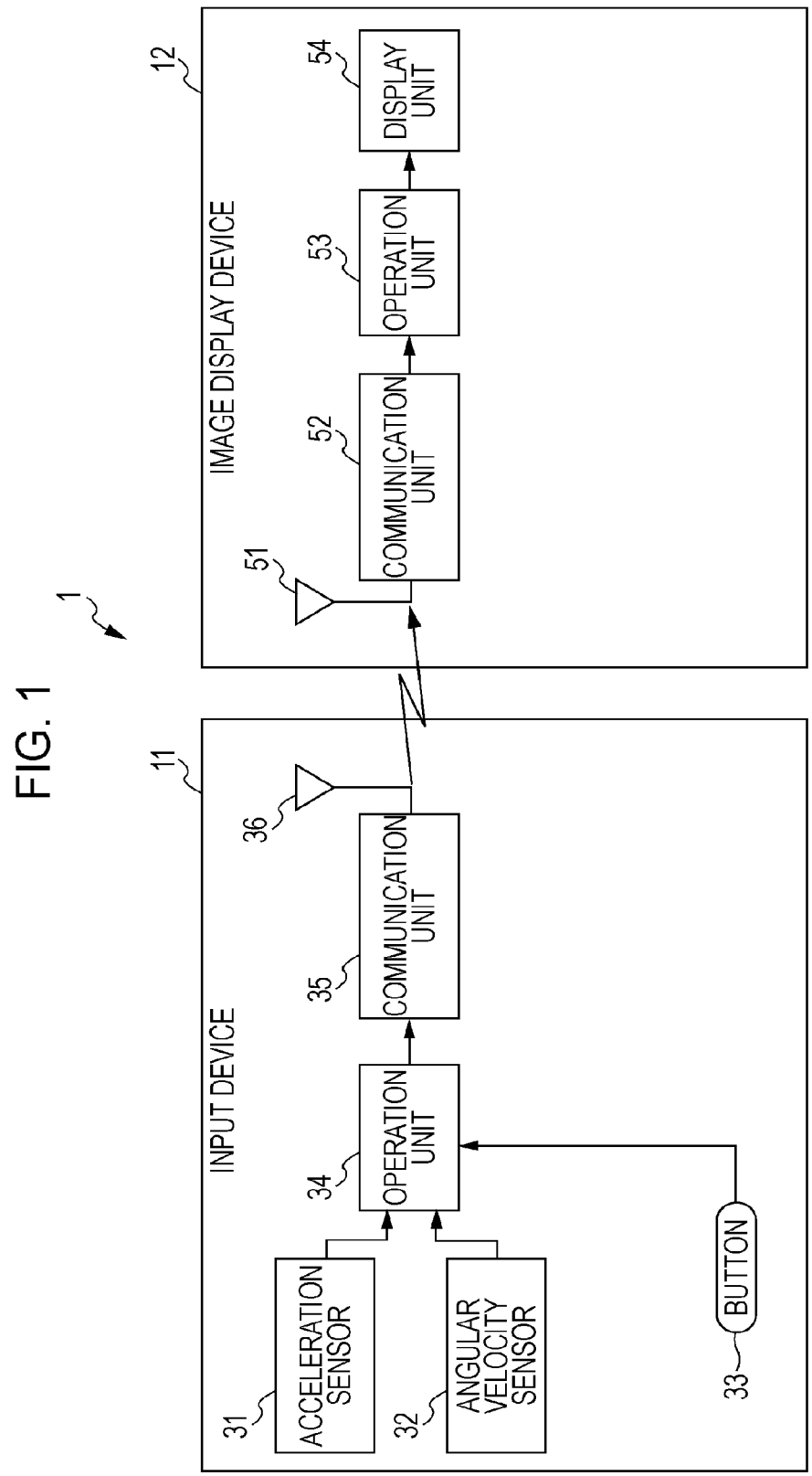
FIG. 1 is a block diagram illustrating the configuration of an information processing system according to an embodiment of the present invention.

1. First embodiment (configuration of a system)
2. First embodiment (configuration of an input device)
3. First embodiment (functional configuration of an operation unit of an input device)
4. First embodiment (functional configuration of an operation unit of an image display apparatus)
5. First embodiment (command transmission processing)
6. First embodiment (object zoom processing 1)
7. Second embodiment (object zoom processing 2)
8. Third embodiment (EPG display processing)
9. Modifications First Embodiment Configuration of a System FIG. 1 shows the configuration of an information processing system according to an embodiment of the present invention.

An information processing system 1 includes an image display apparatus 12 as an information processing apparatus and an input device 11 as a pointing device or remote controller which performs remote control of the image display apparatus.

The input device 11 includes an acceleration sensor 31, an angular velocity sensor 32, buttons 33, an operation unit 34, a communication unit 35, and an antenna 36.

The input device 11 is a so-called air remote controller. The acceleration sensor 31 and the angular velocity sensor 32 detect acceleration and an angular velocity of the input device 11, respectively, when the input device 11 is manipulated in an arbitrary direction in a three-dimensional (3D) space.

The buttons 33 are manipulated by a user. Although one button 33 is illustrated in the drawing, a plurality of buttons are actually provided. For example, the buttons 33 includes determination buttons that are manipulated when selection is confirmed, and ten keys corresponding to numerals.

For example, the operation unit 34 composed of a microprocessor and the like detects results of manipulation of the acceleration sensor 31, the angular velocity sensor 32, and the buttons 33. Signals of command and the like that correspond to the results of detection are amplified and modulated by the communication unit 35, and then transmitted as a radio wave to the image display apparatus 12 through the antenna 36.

For example, the image display apparatus 12 composed of a television receiver includes an antenna 51, a communication unit 52, an operation unit 53, and a display unit 54.

The antenna 51 receives the radio wave from the input device 11. The communication unit 52 amplifies and demodulates the signal received through the antenna 51. For example, the operation unit 53 which is composed of a microcomputer and the like performs a predetermined operation on the basis of the signal output from the communication unit 52. The display unit 54 displays an image. Although not illustrated, the image display apparatus 12 functions to receive and display a television broadcasting signal on the display unit 54.

Also, the input device 11 may be communicated with image display apparatus 12 by air, or infrared rays may be used as a medium for the communication therebetween.

[Configuration of an Input Device]

Figure 2:
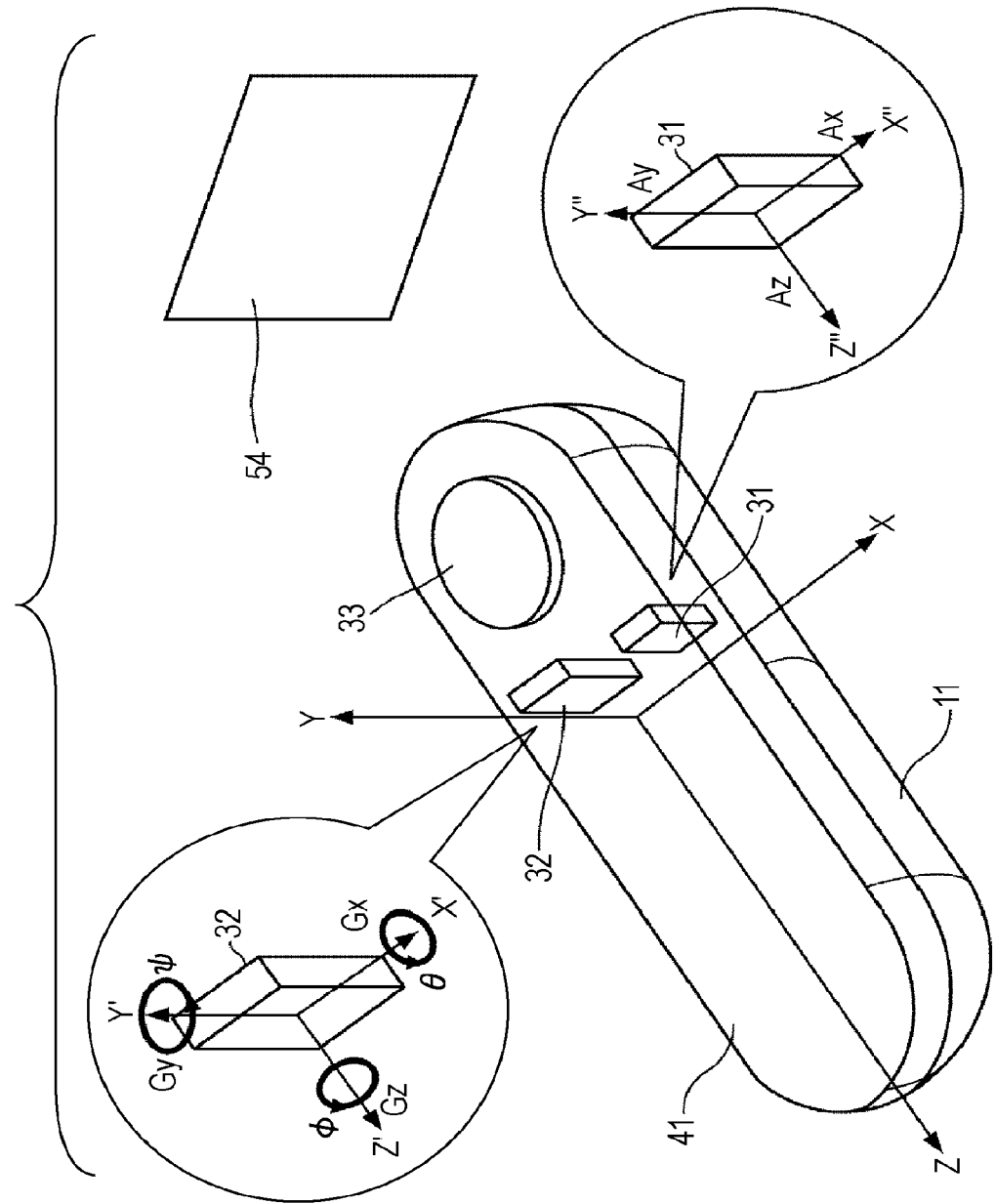
FIG. 2 is a perspective view illustrating the configuration of an input device.

FIG. 2 shows the configuration of the external appearance of the input device. The input device 11 has a main body 41 as a manipulation unit which is manipulated by a user in order to generate a remote manipulation signal for controlling the image display apparatus 12 as the information processing apparatus. On an upper surface of the main body 41, although one button 33 is representatively illustrated, a plurality of buttons are actually installed.

The user holds the input device 11, i.e. the main body 41, in one hand, and manipulates the input device in an arbitrary direction in a three-dimensional space or manipulates the buttons 33 in a state in which the front of the input device 11 faces the image display apparatus 12. Accordingly, it is possible to move a pointer in a manipulation direction, to set a predetermined mode, and to instruct a predetermined operation.

At the front of the input device 11, the acceleration sensor 31 and the angular velocity sensor 32, which are manufactured by the technique of MEMS (Micro Electro Mechanical Systems), are attached. X", Y", and Z" are axes of the acceleration sensor 31 which are perpendicular to one another in a relative coordinate system, and X', Y', and Z' are axes of the angular velocity sensor 32 which are perpendicular to one another in the relative coordinate system. The X", Y", and Z" axes are parallel to the X', Y', and Z' axes, respectively. X, Y, and Z are axes which are perpendicular to one another in an absolute coordinate system. The Y axis is an axis in a vertical direction, and the X and Z axes are axes in a horizontal plane. The Y axis is an axis in the vertical direction which is perpendicular to the horizontal plane.

The entire main body 41 is manipulated in an arbitrary direction in a three-dimensional space by the user typically in a state in which the front (i.e. upper right end in FIG. 2) of the main body 41 faces the display unit 54 of the image display apparatus 12 that is located before the main body. In this case, the angular velocity sensor 32 which is a biaxial oscillation type angular velocity sensor detects the angular velocities of the pitch angle θ and the yaw angle ψ rotating around a pitch rotation axis and a yaw rotation axis which are parallel to the X' and Y' axes, respectively. An earth magnetic type angular velocity sensor may be used instead of the oscillation type angular velocity sensor. The acceleration sensor 31 detects the acceleration Ax(t) and Ay(t) in the X" and Y" directions. The acceleration sensor 31 can detect the acceleration as vector quantity. As the acceleration sensor 31, it is also possible to use a triaxial acceleration sensor which has three axes of X", Y", and Z" axes as sensitivity axes.

A user manipulates the entire input device 11 in the arbitrary direction in the three-dimensional free space while holding the input device 11 with one hand. The input device 11, which is a so-called air remote controller, is not used in a state in which it is put on a desk, but is manipulated in the air. The input device 11 detects the manipulation direction and outputs a manipulation signal corresponding to the manipulation direction. In addition, the input device 11 outputs a corresponding manipulation signal when the buttons 33 are manipulated.

[Functional Configuration of an Operation Unit of an Input Device]

Figure 3:
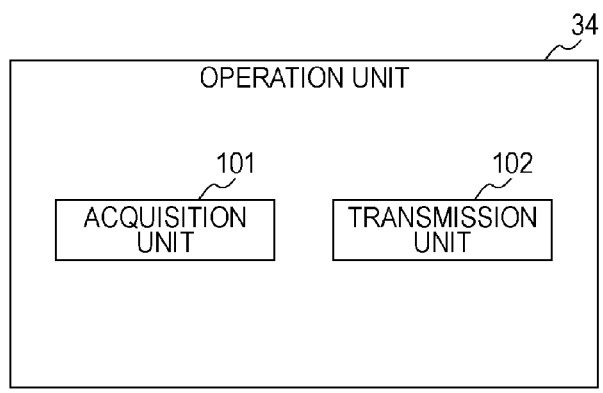
FIG. 3 is a block diagram illustrating the functional configuration of an operation unit of the input device.

FIG. 3 shows the functional configuration of an operation unit 34 of the input device 11. The operation unit 34 includes an acquisition unit 101 and a transmission unit 102.

The acquisition unit 101 acquires button information corresponding to a manipulated button in addition to the angular velocity or the acceleration. The transmission unit 102 transmits a command based on the acquired information to the image display apparatus 12.

[Functional Configuration of an Operation Unit of an Image Display Apparatus]

Figure 4:
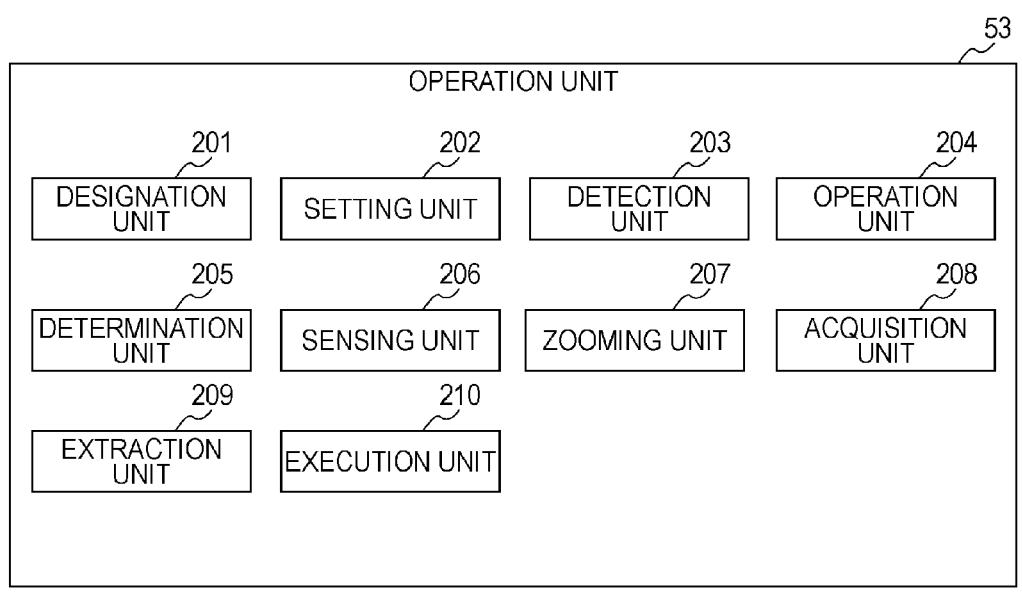
FIG. 4 is a block diagram illustrating the functional configuration of an operation unit of an image display apparatus.

FIG. 4 shows the functional configuration of an operation unit 53 of the image display unit 12. The operation unit 53 includes a designation unit 201, a setting unit 202, a detection unit 203, an operation unit 204, a determination unit 205, a sensing unit 206, a zoom unit 207, an acquisition unit 208, an extraction unit 209, and an execution unit 210.

The designation unit 201 designates an object. The setting unit 202 sets a mode. The detection unit 203 detects zoom manipulation. The operation unit 204 operates the zoom rate. The determination unit 205 performs various kinds of determination. The sensing unit 206 senses a defect in display information. The zoom unit 207 zooms in on the object. The acquisition unit 208 acquires the display condition of the display information. The extraction unit 209 extracts a region of a virtual plane. The execution unit 210 executes the processing that corresponds to the object.

[Command Transmission Processing]

Figure 5:
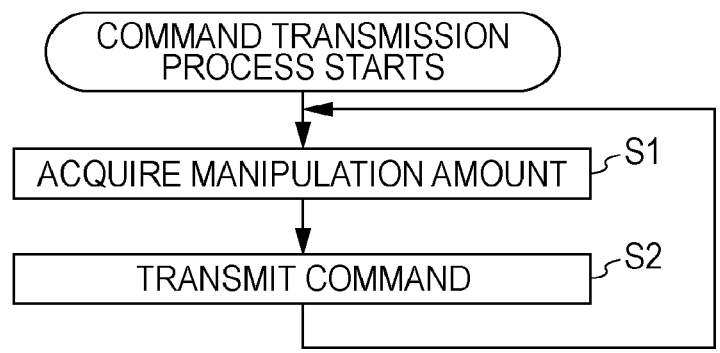
FIG. 5 is a flowchart illustrating the command transmission processing.

FIG. 5 is a flowchart illustrating the command transmission processing of an input device 11. Hereinafter, with reference to FIG. 5, the command transmission processing of the input device 11 will be described.

In step S1, the acquisition unit 101 acquires a manipulation amount. Specifically, it acquires detection outputs of the acceleration sensor 31 and the angular velocity sensor 32, and button information based on the manipulation of the buttons 33.

That is, the angular velocity sensor 32 outputs the angular velocity ($\omega\psi(t)$, $\omega\theta(t)$) around Y' axis and X' axis of motion occurring when a user holds and manipulates the input device 11 in the three-dimensional free space. In the same manner, the acceleration sensor 31 outputs acceleration (Ax(t), Ay(t)) of X" axis and Y" axis of motion occurring when a user holds and manipulates the input device 11 in the three-dimensional free space. The acquisition unit 101 acquires the detected angular velocity ($\omega\psi(t)$, $\omega\theta(t)$) and acceleration (Ax(t), Ay(t)). Specifically, the angular velocity ($\omega\psi(t)$, $\omega\theta(t)$) and the acceleration (Ax(t), Ay(t)) are analog-to-digital (A/D) converted by and stored in an analog-to-digital (A/D) converter built in the operation unit 34.

Then, in step S2, the transmission unit 102 transmits a command based on the result of acquisition in step S1. Specifically, the command is modulated by the communication unit 35, and transmitted as a radio wave to the image display apparatus 12 through the antenna 36.

In this case, it is not necessary that the command is the form of a command, and it may be information that can support the image display apparatus 12 in performing a predetermined processing.

By repeating the above-described process, a predetermined command provided from the input device 11 is transmitted to the image display apparatus 12 on the basis of the user's manipulation.

Object Zoom Processing 1

If the command is transmitted from the input device 11 through the processing illustrated in FIG. 5, the antenna 51 of the image display apparatus 12 receives the corresponding radio wave. The communication unit 52 demodulates the command received through the antenna 51 and supplies the demodulated command to the operation unit 53. The acquisition unit 208 of the operation unit 53 acquires the transmitted command. The execution unit 210 executes the corresponding process on the basis of the command. For example, if the user instructs the zooming in on an object, the processing of zooming in on an object is executed.

Figure 6:
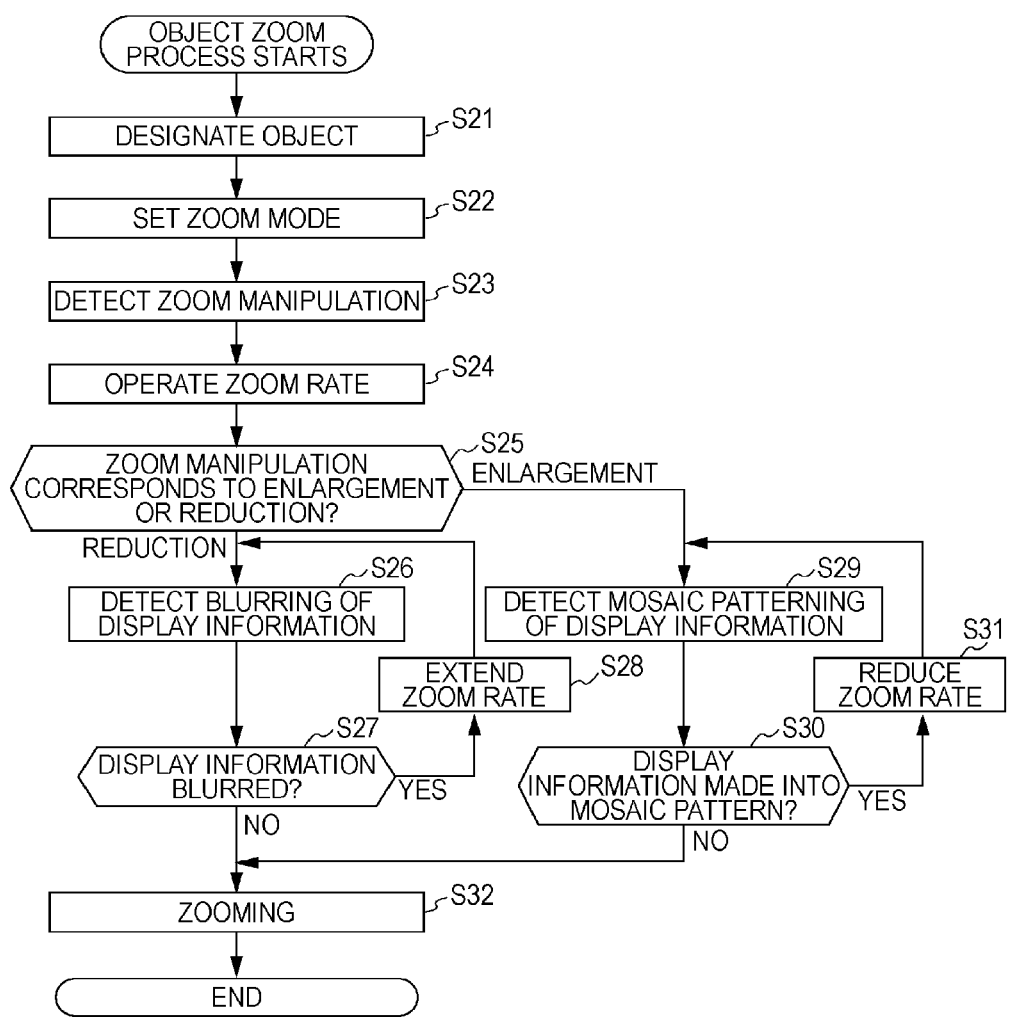
FIG. 6 is a flowchart illustrating object zoom processing.

FIG. 6 is a flowchart illustrating the processing of zooming in on an object executed by the image display apparatus 12. Hereinafter, with reference to FIG. 6, the process of designating the predetermined object and zooming in on the object will be described.

In step S21, the designation unit 201 designates the object. That is, in the case of zooming in on the object displayed on the display unit 54, the user designates the object to be zoomed in on by manipulating the input device 11. Specifically, in a pointing mode, a predetermined object is designated by the pointer. If a remote control signal based on this manipulation is received, the designated object becomes the target of zooming.

Figure 7:
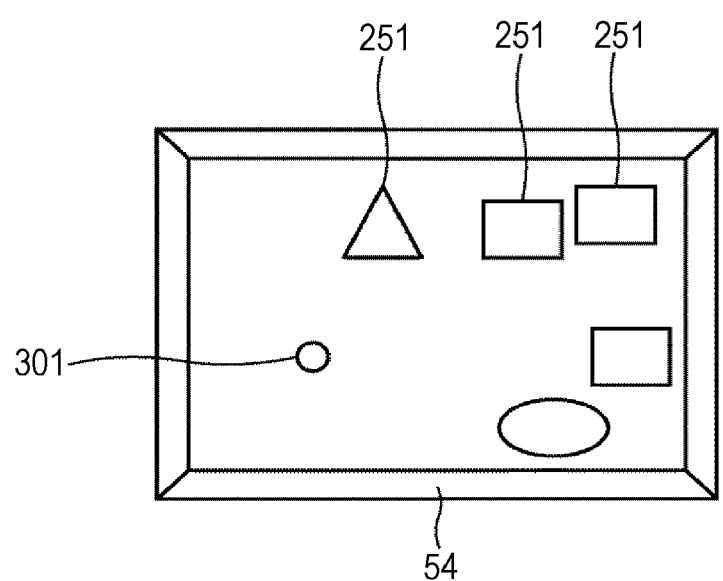
FIG. 7 is a diagram illustrating a display example of an object.

FIG. 7 shows a display example of an object. As illustrated in FIG. 7, in a state in which an arbitrary number of objects 251 are displayed on the display unit 54, the user designates the object to be zoomed in on by using the pointer 301. For example, as shown in FIG. 7, an object 251 indicated as a triangle is designated.

After the object to be zoomed in on is designated, the user performs gesture manipulation for setting a zoom mode by holding the input device 11 with one hand.

Figure 8:
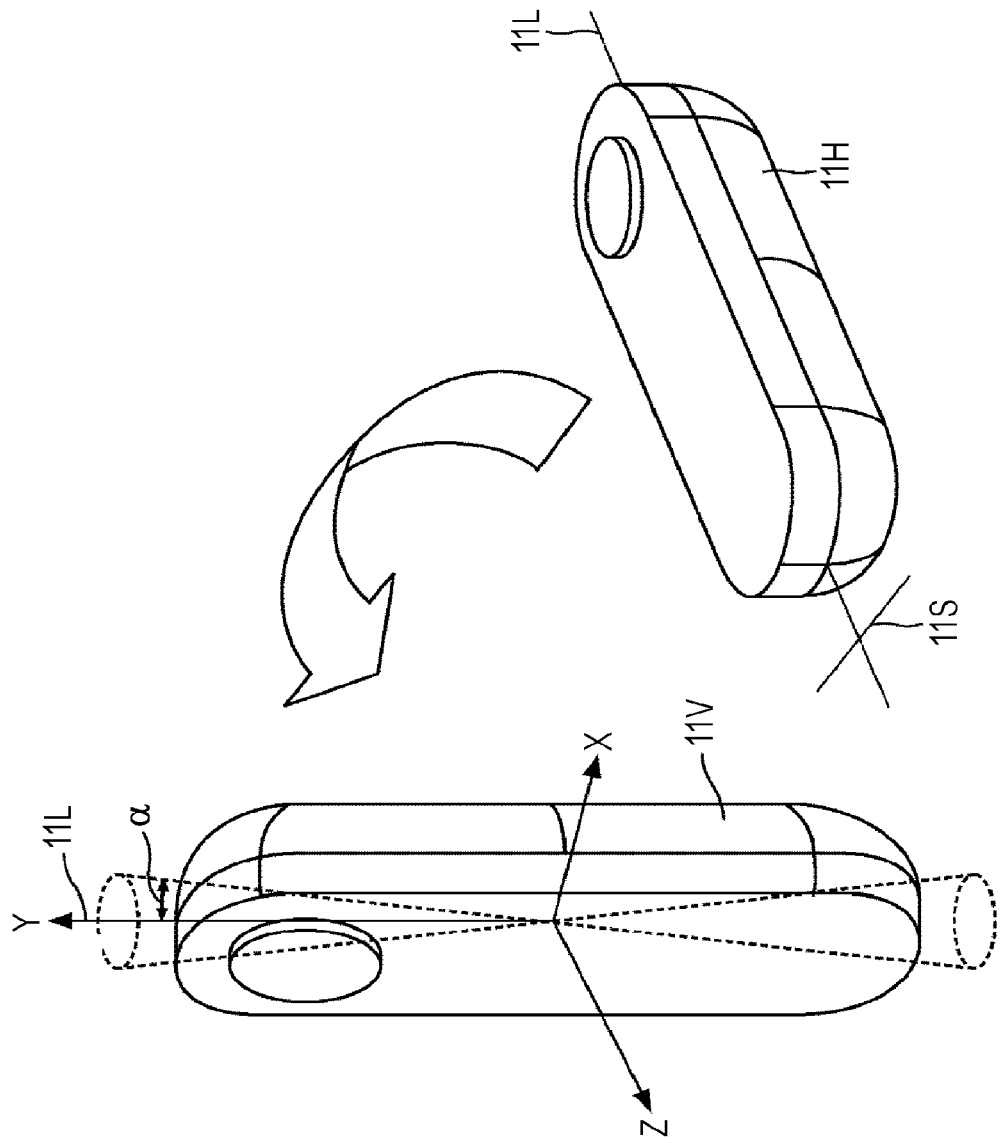
FIG. 8 is a diagram illustrating a first gesture.

FIG. 8 shows a gesture for setting a zoom mode. When setting the zoom mode, the user performs the first gesture manipulation. The first gesture is illustrated in FIG. 8. That is, the input device 11 is first in a horizontal position (i.e. a position indicated by a reference numeral 11H) in which the front of the input device 11 faces upward. From this state, the input device 11 is rotated around an axis 11S that is perpendicular to an axis 11L in a length direction so that the input device 11 is in a vertical position (i.e. a position indicated by a reference numeral 11V) in which the front of the input device 11 faces the user and the front end of the input device 11 faces upward. If a remote control signal that corresponds to the first gesture is received, the setting unit 202 sets a zoom mode in step S22. When the zoom mode is set, the previous mode, e.g. the pointing mode, is cancelled.

The angle α of the axis 11L in a length direction of the input device 11 against the Y axis may be determined from the size of the acceleration Az(t) in Z"-axis direction as illustrated in FIG. 2. If the angle α against the Y axis is within a predetermined threshold value (e.g.) 10°, it is determined that the input device 11 is in a vertical position in which the input device faces upward. For example, if a difference between the acceleration Az(t) and the gravitational acceleration g is equal to or less than the threshold value, i.e. if the acceleration Az(t) is almost the same as the gravitational acceleration g, it can be determined that the input device 11 is in a vertical position in which it faces upward.

Of course, the decision of the positioning may be made using other various kinds of information transmitted by the processing in step S2 as shown in FIG. 5.

If the input device 11 is not in a vertical position in which the input device faces upward, i.e. if the angle α is larger than the threshold value, the zoom mode is not set, and the original mode (e.g. the pointing mode) continues.

Figure 9:
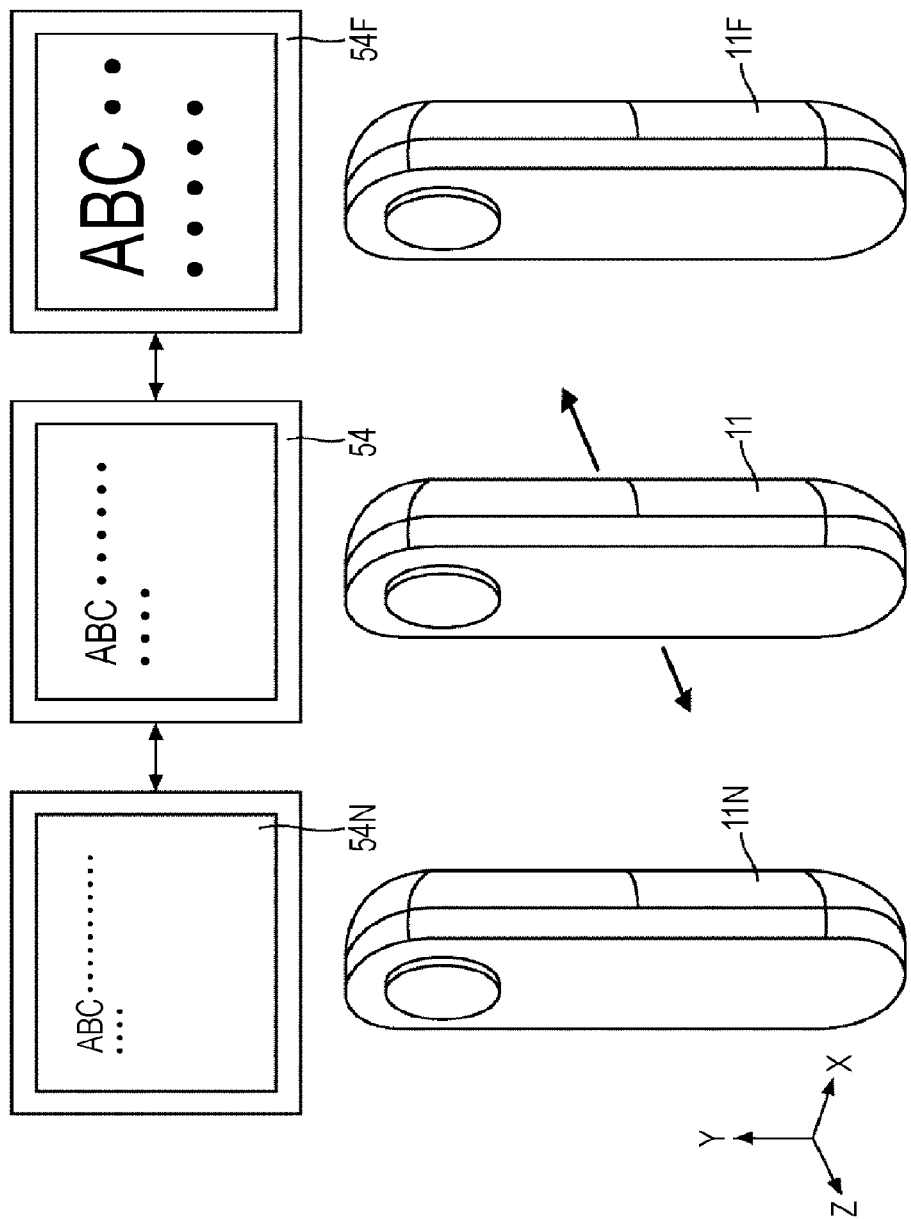
FIG. 9 is a diagram illustrating a second gesture.

After the angle α becomes equal to or less than the threshold value and the zoom mode is set, a user may perform the second gesture manipulation for zooming in on the screen display. FIG. 9 shows the second gesture. As shown in the same drawing, the second gesture is a manipulation that moves the input device 11 in parallel to a position moving close to a user as indicated by a reference numeral 11N or to a position moving away from the user as indicated by a reference numeral 11F while the input device 11 is kept in the vertical position in which the input device faces upward. In step S23, the detection unit 203 detects this zoom manipulation from the remote control signal. That is, the second gesture manipulation is detected.

In step S24, the operation unit 24 operates the zoom rate on the basis of the remote control signal for the zoom manipulation of the input device 11. The zoom rate, for example, becomes higher as the distance of the parallel movement is lengthened, while it becomes lower as the distance of the parallel movement is shortened as shown in FIG. 9.

In step S25, the determination unit 205 determines whether the zoom manipulation corresponds to enlargement or reduction. If the input device 11 is moved backward, i.e. if the input device is moved in a direction moving closer to the user, it is determined that the zoom manipulation is for reduction. By contrast, if the input device 11 is moved in a depth direction, i.e. if the input device is moved in a direction moving away from the user, it is determined that the zoom manipulation is for the enlargement. Of course, it is also possible to define these directions in a reverse manner.

In FIG. 9, if the input device 11 is moved from a position indicated by a reference numeral 11 to a position indicated by a reference numeral 11N, i.e. if the input device is moved in a direction moving closer to the user, the acceleration Ay(t) in the Y"-axis direction in FIG. 2 becomes positive (or negative). By contrast, if the input device 11 is moved in a depth direction (e.g. a direction of the display unit 54), i.e. if the input device is moved in a direction moving away from the user, the acceleration Ay(t) in the Y"-axis direction becomes negative (or positive). Accordingly, this determination can be made from the polarity of the acceleration Ay(t).

If the input device 11 is moved backward, the sensing unit 206 recognizes the display information and senses its defect in step S26. The defect of the object is a change that exceeds a threshold value in at least a part of the object. For example, blurring of the display information that is displayed on the object is sensed. Specifically, in the case in which the object is reduced at a zoom rate operated in step S24, it is sensed whether the display information, such as the character, figure, face image, or the like, that is displayed on the object is blurred.

In step S27, the determination unit 205 determines whether the display information is blurred on the basis of the result of sensing in step S26. In the case of a character or a figure, when the number of strokes of a character or a space between lines that indicate a figure becomes equal to or less than a predetermined threshold value, it is determined that the display information is blurred. Also, in the case of a face image, when the distance of the contour of a predetermined region, such as a mouth, a nose, or the like, becomes equal to or less than a predetermined threshold value, it is determined that the display information is blurred.

If it is determined that the display information is blurred, the operation unit 204 increases the zoom rate in step S28. That is, if it is assumed that the size of the object when the object is reduced at the zoom rate $ZR_1$ operated in step S24 is $OS_1$, the zoom rate is changed to $ZR_2(=ZR_1+1)$ which is larger than $ZR_1$ by one step so that the object has a larger size $OS_2(>OS_1)$.

In step S26, the sensing unit 206 senses blurring of the display information in the case in which the object is reduced at the zoom rate $ZR_2$ set in step S28. In step S27, the determination unit 205 determines whether the display information is blurred on the basis of the result of the sensing in step S26.

By repeating the processing in steps S26 to S28, the zoom rate $ZR_A$ is obtained which is just less than that when the display information is blurred. Once the zoom rate $ZR_A$ is obtained which is just less than that when the display information is blurred, the zoom unit 207 zooms in on the designated object at the obtained zoom rate $ZR_A$ in step S32. As a result, the user can rapidly make the object into the minimum size in which the display information being displayed can be confirmed.

If it is determined that the zoom manipulation corresponding to the enlargement has been performed in step S25, i.e. if the input device 11 has been moved in a depth direction, the sensing unit 206 recognizes the display information and senses its defect in step S29. Here, a change that exceeds the threshold value in at least a part of the object is sensed as a defect. For example, it is sensed that the display information that is displayed on the object has been made into a mosaic pattern. Specifically, in the case in which the object is enlarged at a zoom rate operated in step S24, it is sensed whether the display information, such as the character, figure, face image, or the like, that is displayed on the object has been made into a mosaic pattern.

In step S30, the determination unit 205 determines whether the display information has been made into a mosaic pattern on the basis of the result of the sensing in step S29. In the case of a character or a figure, when the number of strokes of a character or a line that indicates a figure becomes a zigzag line, it is determined that the display information has been made into a mosaic pattern. Also, in the case of a face image, when the line of the contour of a predetermined region, such as a mouth, a nose, or the like, becomes a zigzag line, it is determined that the display information has been made into a mosaic pattern.

Although a line is formed by connection of a plurality of pixels, it is recognized by a user as a natural and smooth continuity in a state in which it is not enlarged. Accordingly, in microscopy, i.e. in obtaining a line in the unit of a pixel, any line may be in a zigzag state. However, the term "zigzag" as the basis of determining a mosaic patterning does not mean such a state that may not be actually observed.

The term "zigzag" as the basis of determining the mosaic patterning may be the basis that prohibits excessive enlargement which makes it difficult for a user to recognize a line as a natural and smooth continuity. Accordingly, for example, in accordance with the enlargement processing, a block is formed by a set of pixels constituting the line of the contour, a plurality of neighboring pixels having the same luminance, and a plurality of neighboring pixels having different luminance which is smaller than a predetermined threshold value. When the length of at least one side of the block becomes larger than the predetermined threshold value, it may be determined that the display information has been made into a mosaic pattern.

If it is determined that the display information has been made into a mosaic pattern, the operation unit 204 reduces the zoom rate in step S31. That is, if it is assumed that the size of the object when the object is increased at the zoom rate $ZR_1$ operated in step S24 is $OS_3$, the zoom rate is changed to $ZR_3(=ZR_1-1)$ that is smaller than $ZR_1$ by one step so that the object has a smaller size $OS_4(<OS_3)$.

In step S29, the sensing unit 206 senses the mosaic patterning of the display information in the case in which the object is enlarged at the zoom rate $ZR_3$ set in step S31. In step S30, the determination unit 205 determines whether the display information has been made into a mosaic pattern on the basis of the result of the sensing in step S29.

By repeating the processing in steps S29 to S31, the zoom rate $ZR_B$ is obtained which is just less than that when the display information has been made into a mosaic pattern. Once the zoom rate $ZR_B$ is obtained which is just less than that when the display information has been made into a mosaic pattern, the zoom unit 207 zooms in on the designated object at the obtained zoom rate $ZR_B$ in step S32. As a result, the user can rapidly make the object into the maximum size in which the display information being displayed can be properly confirmed.

Figure 10:
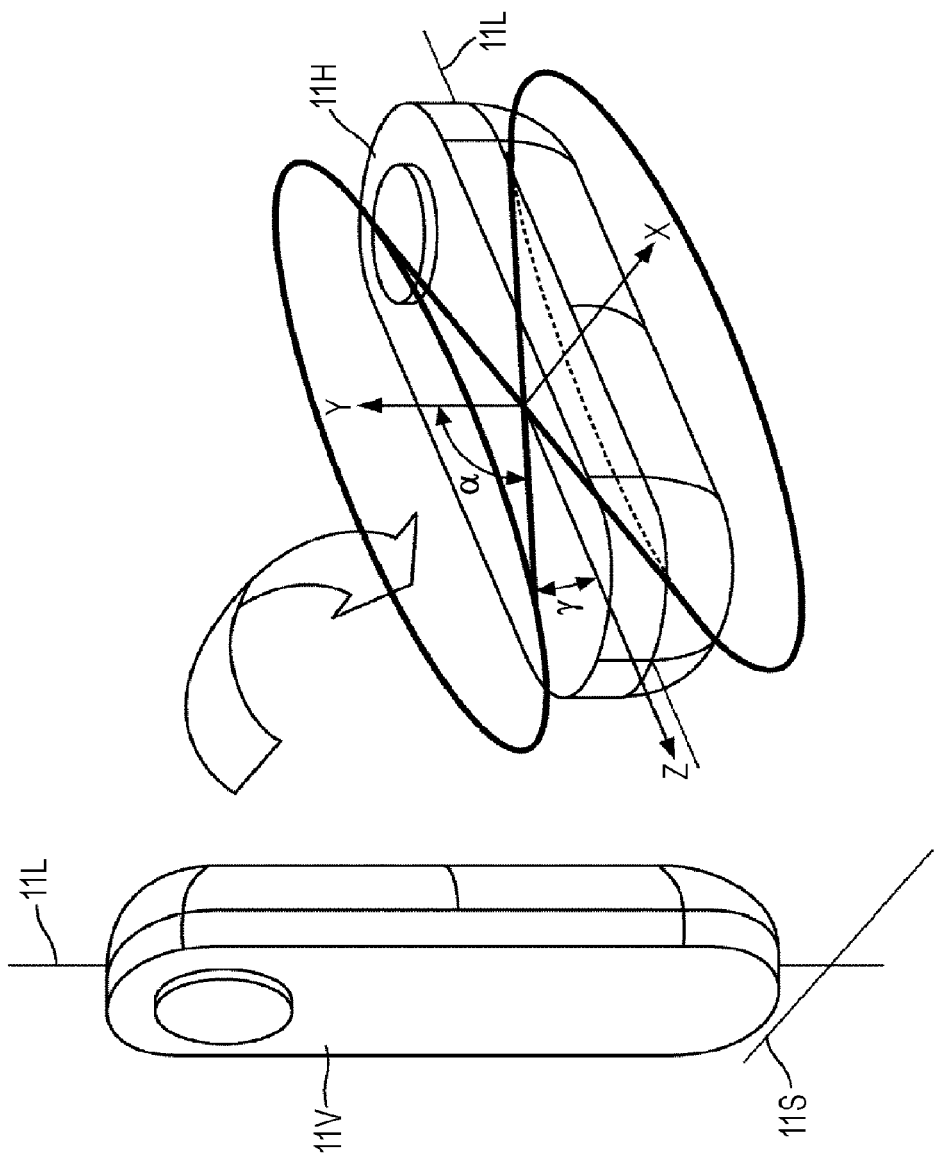
FIG. 10 is a diagram illustrating a third gesture.

In this case, when setting the pointing mode, the user performs the third gesture manipulation. FIG. 10 shows the third gesture. As shown in the same drawing, the third gesture is a gesture in which the input device 11 is rotated around an axis 11S that is perpendicular to an axis 11L in a length direction of the input device 11 from a vertical position (i.e. a position indicated by a reference numeral 11V) in which the front end of the input device 11 faces upward so that the front of the input device 11 faces the user to a horizontal position (i.e. a position indicated by a reference numeral 11H) in which the front of the input device 11 faces upward. That is, the third gesture is the opposite of the first gesture.

If the angle $\gamma$ against the Z axis is within a predetermined threshold value (e.g. 10°), it is determined that the input device 11 is in a horizontal position. In other words, if the angle $\alpha(=90-\gamma)$ between the axis 11L in the length direction of the input device 11 and the Y axis is equal to or more than 80°, it is determined that the input device 11 is in the horizontal position.

The angle $\gamma$ of the axis 11L in the length direction of the input device 11 against the Z axis may be determined from the size of the acceleration Az(t) in the Z"-axis direction as illustrated in FIG. 2. For example, if the acceleration Az(t) in the Z"-axis direction is almost "0", i.e. if a component of force of the gravitational acceleration g in the Z"-axis direction is nearly zero, it is determined that the input device 11 is in the horizontal position.

As described above, a user can change the mode by performing the gesture manipulation so that the position of the input device 11 is changed to be in a predetermined direction in a three-dimensional space.

In this case, the modes to be controlled are not limited to the pointing mode and the zoom mode. A scroll mode, a channel change/return mode, a volume up/down mode, and other modes may be the subject to control.

Also, the gestures of the input device 11 are not limited to those as illustrated in FIGS. 8 to 10.

Figure 11A:
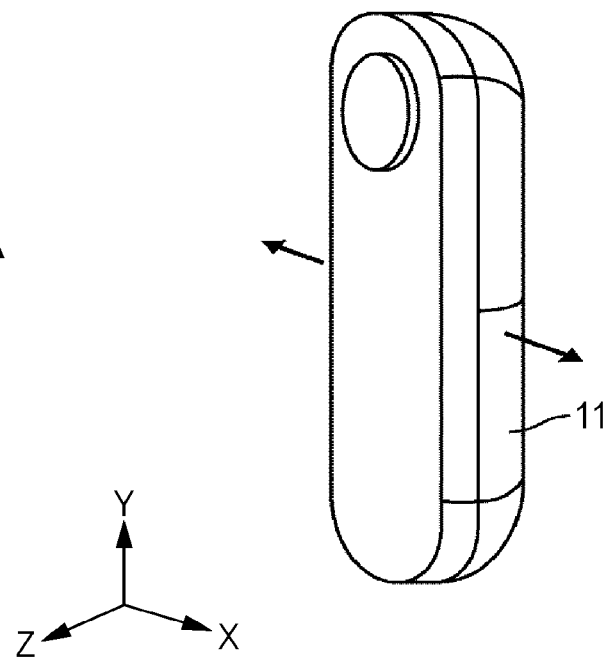
FIGS. 11A and 11B are diagrams illustrating another gesture.
Figure 11B:
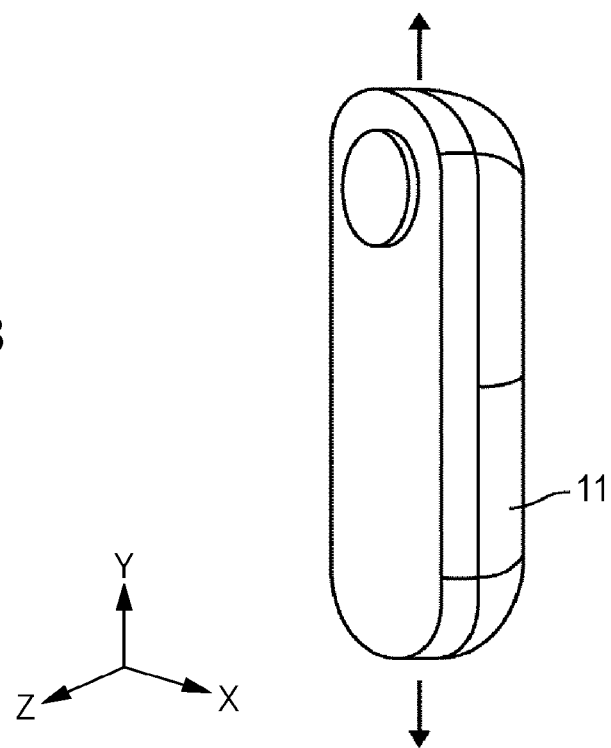

FIGS. 11A and 11B show another gesture. As shown in FIGS. 11A and 11B, a manipulation that moves the input device in parallel in left and right direction (see FIG. 11A) or in upward and downward direction (see FIG. 11B) in a state in which the input device is in a vertical position in which the input device faces upward (see FIGS. 11A and 11B) may be determined as the second gesture.

Figure 12:
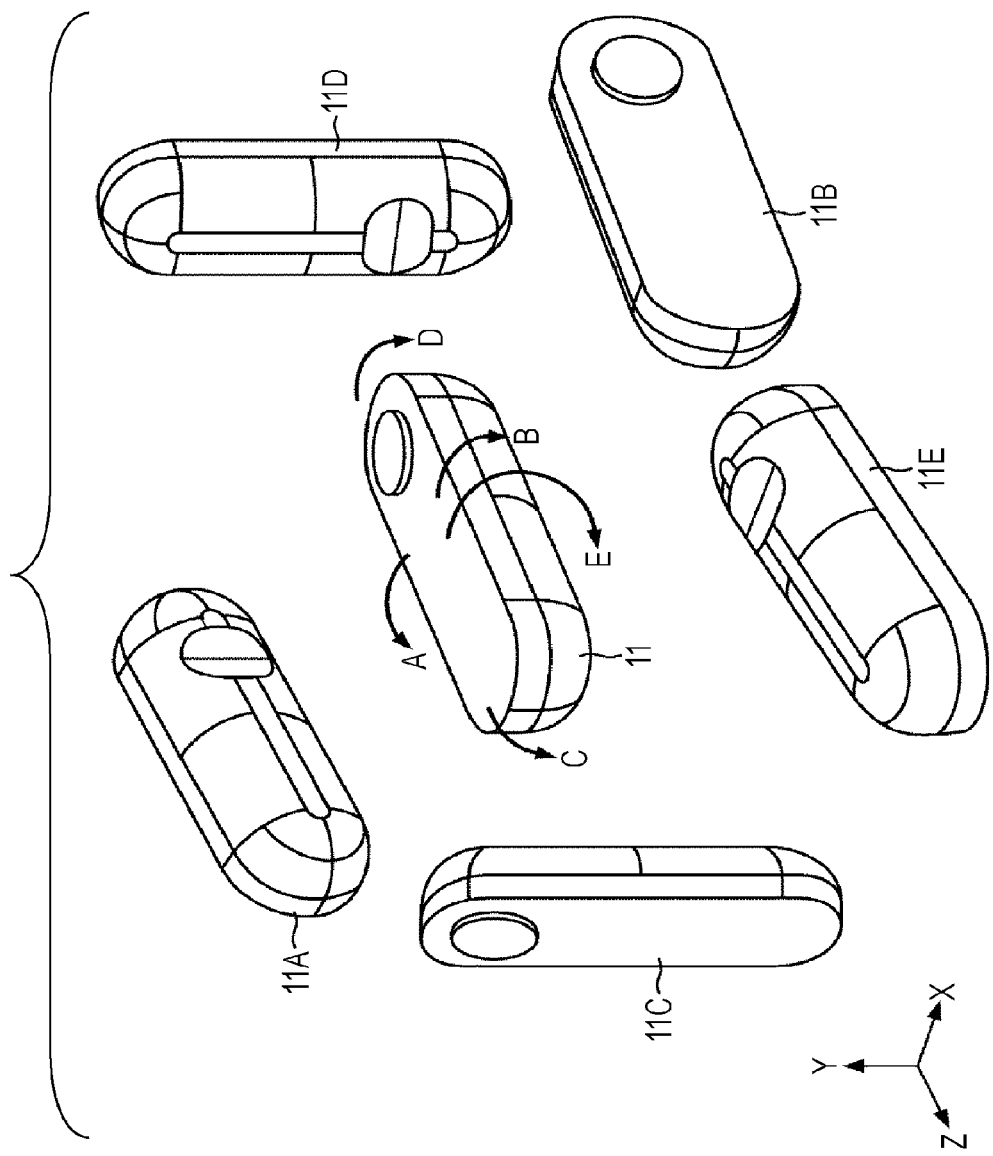
FIG. 12 is a diagram illustrating another gesture.

FIG. 12 shows still another gesture. As shown in the same drawing, if the input device 11 is rotated by 90° in a direction C from a horizontal position that is the basic gesture indicated by a reference numeral 11 to a position in which the front end of the input device faces upward, the input device 11 is in a vertical position in which the input device 11 faces upward as indicated by a reference numeral 11C. This gesture is illustrated in FIG. 8.

In addition, if the input device 11 is rotated by 90° in a direction D from a horizontal position to a position in which the front end of the input device faces downward, the input device 11 is in a vertical position in which the input device 11 faces downward as indicated by a reference numeral 11D.

Also, if the input device 11 is rotated by 90° in a counterclockwise direction A from a horizontal gesture, the input device 11 is in a gesture in which the input device 11 is rotated counterclockwise by 90° as indicated by a reference numeral 11A. If the input device 11 is rotated by 90° in a clockwise direction B from a horizontal gesture, the input device 11 is in a gesture in which the input device 11 is rotated clockwise by 90° as indicated by a reference numeral 11B. If the input device 11 is rotated by 180° in a clockwise direction B from a horizontal gesture, the input device 11 is in a gesture in which the input device 11 is turned upside down as indicated by a reference numeral 11E.

The gesture may be determined as the first gesture or the third gesture.

Using these gestures, the same function as described above can be performed. By combining these gestures as the first to third gestures, a user can perform an intuitive manipulation.

Since the zoom rate is set based on the third gesture manipulation in the three-dimensional space of the input device 11, it is necessary for a user to finely control the distance by which the input device 11 is moved forward and backward in order to designate a desired zoom rate. However, such a fine control demands familiarity, and thus it is difficult for an unfamiliar user to perform such a fine control. As a result, if an unfamiliar user performs the gesture manipulation, the zoom rate may be set to be extremely high or low. Accordingly, by setting the zoom rate which is just less than that when there is an occurrence of blurring or mosaic patterning, it is possible to quickly set the zoom rate, and thus the manipulability can be improved.

Second Embodiment

Object Zoom Processing 2

In the embodiment of FIG. 6, if the display information has a defect, the zoom rate is typically changed. However, the occurrence of some degree of defect of the display information may be permitted by some users. In this case, the users may register in advance display conditions of the display information. If the registered display condition does not permit blurring or mosaic patterning of the display information, the same process as that illustrated in FIG. 6 is performed. However, if the registered display condition permits blurring or mosaic patterning of the display information, the zooming is performed at a zoom rate designated by the user. Hereinafter, with reference to FIG. 13, the processing of zooming in on an object in this case will be described.

Figure 13:
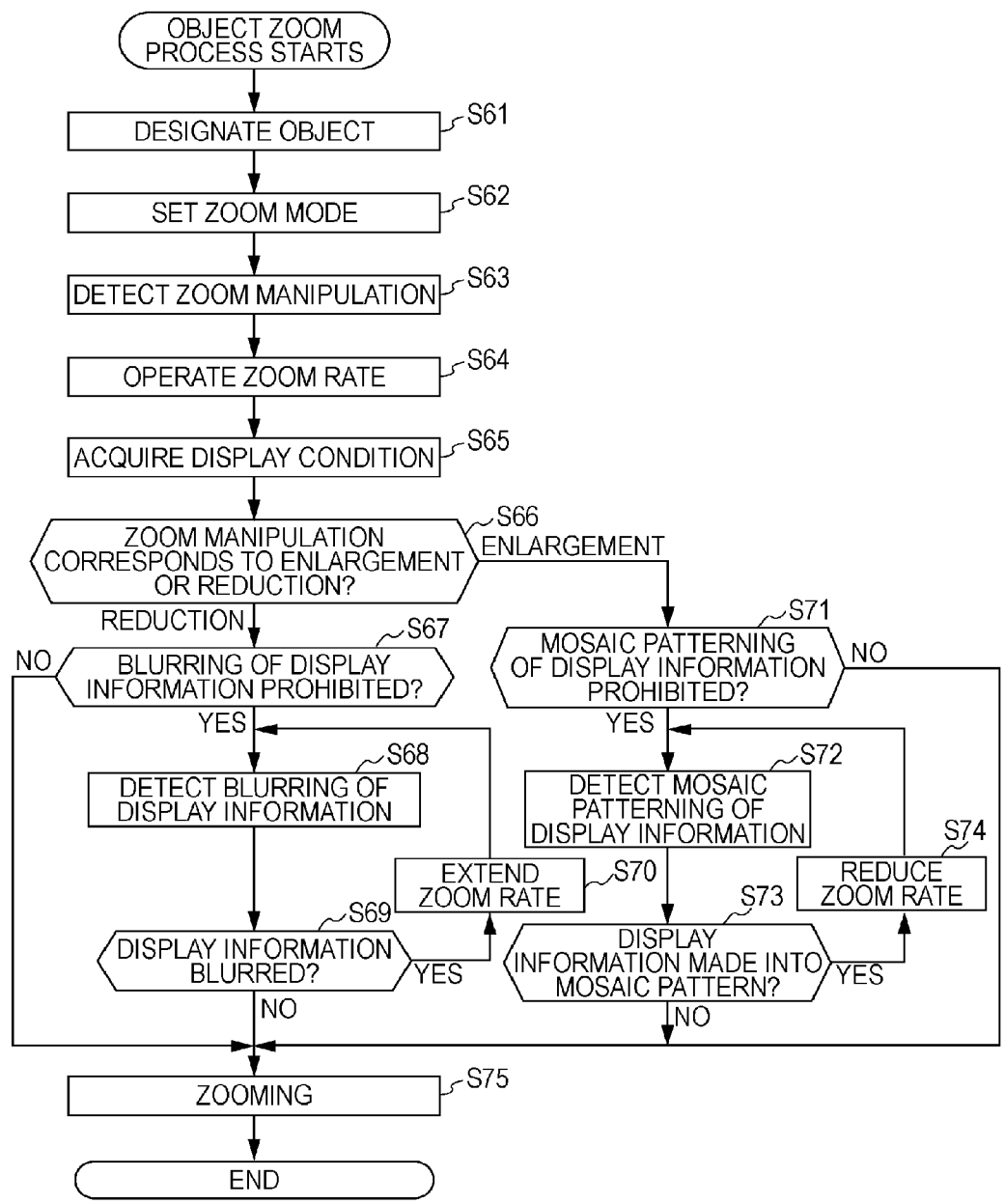
FIG. 13 is a flowchart illustrating object zoom processing.

FIG. 13 is a flowchart illustrating the processing of zooming in on an object. The process in steps S61 to S75 in FIG. 13 is basically the same as the process in steps S21 to S32 in FIG. 6. One difference is that a step S65 is inserted between steps S64 and S66 of FIG. 13 that correspond to steps S24 and S25 of FIG. 6, respectively. Also, another difference is that a step S67 is inserted between steps S66 and S68 of FIG. 13 that correspond to steps S25 and S26 of FIG. 6, respectively. Also, another difference is that a step S71 is inserted between steps S66 and S72 of FIG. 13 that correspond to steps S25 and S29 of FIG. 6, respectively.

In FIG. 13, after the zoom rate based on the second gesture manipulation for the designated object is operated by the processing of steps S61 to S64, the acquisition unit 208 acquires the display condition in step S65. The display condition is registered in advance by a user, and indicates whether the blurring or mosaic patterning of the display information is prohibited or permitted.

In step S66, the determination unit 205 determines which one of enlargement and reduction the zoom manipulation detected in step S63, i.e. the second gesture manipulation, corresponds to. If the zoom manipulation for the reduction has been performed, the determination unit 205 determines whether blurring of the display information has been prohibited in step S67. This determination is performed based on the display condition acquired in step S65.

If blurring of the display information is prohibited, the processing of steps S68 to S70 and step S75 is performed. In this case, the processing is the same as that illustrated in FIG. 6, and the zoom is performed at the zoom rate which is just less than that when the display information is blurred.

By contrast, if blurring of the display information is not prohibited, the processing of steps S68 to S70 is not performed, and the processing of step S75 is immediately performed. Accordingly, the zoom is performed at the zoom rate operated in step S64, i.e. at the zoom rate designated through the user's manipulation of the input device 11.

If it is determined that the zoom manipulation corresponding to the enlargement has been performed in step S66, the determination unit 205 determines whether the mosaic patterning of the display information is prohibited in step S71. This determination is performed base on the display condition acquired in step S65.

If the mosaic patterning of the display information is prohibited, the processing in steps S72 to S75 is performed. In this case, the same processing as that illustrated in FIG. 6 is performed, and the zoom is performed at a zoom rate which is just less than that when the display information has been made into a mosaic pattern.

By contrast, if the mosaic patterning of the display information is not prohibited, the processing in steps S72 to S74 is not performed, but the processing in step S75 is immediately performed. In this case, the zoom is performed at the zoom rate operated in step S64, i.e. at the zoom rate designated through the user's manipulation of the input device 11.

As described above, in the embodiment of the present invention, the user's intention is preferred, and if the user does not permit blurring or mosaic patterning of the display information, the zoom is performed at the zoom rate which is just less than that when the blurring or the mosaic patterning of the display information occurs. By contrast, if the user permits blurring or mosaic patterning of the display information, the zoom is performed at a zoom rate designated by the user.

Third Embodiment

EPG Display Processing

Then, the process of zooming an EPG (Electronic Program Guide) will be described.

Figure 14:
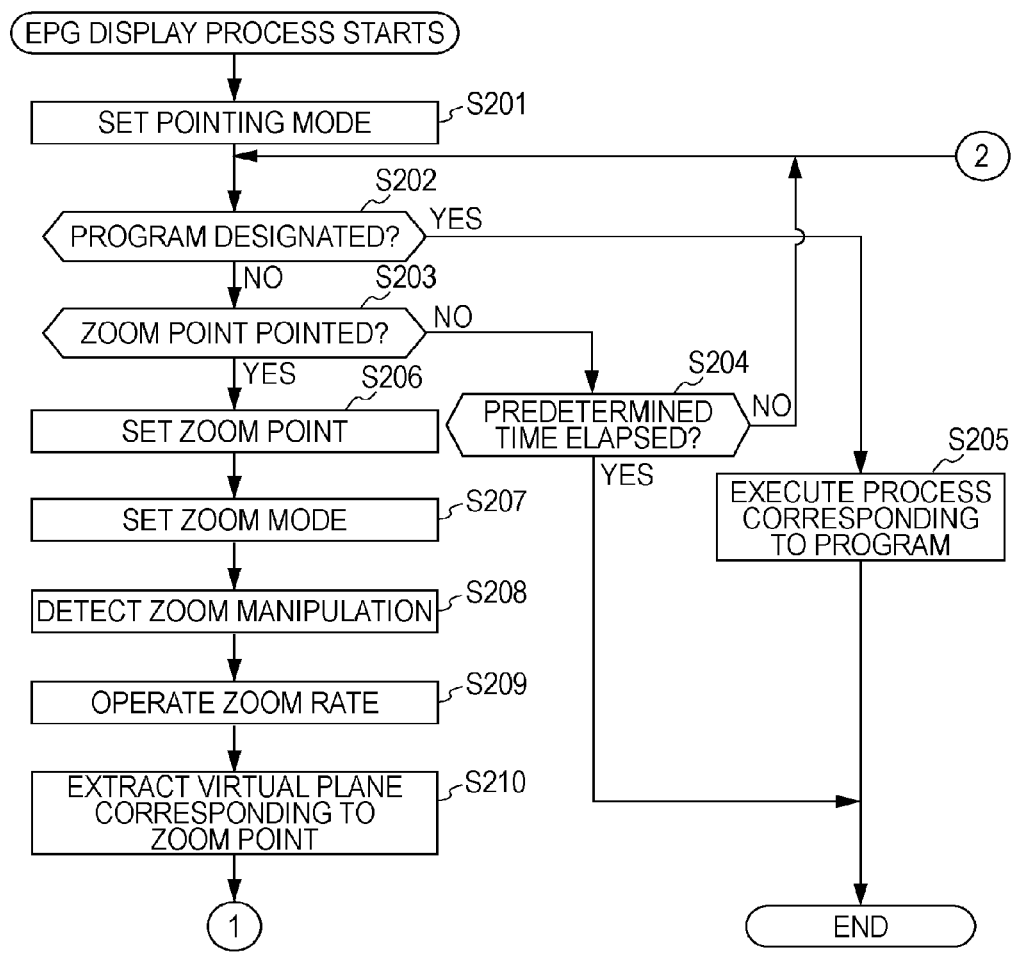
FIG. 14 is a flowchart illustrating the EPG display processing.
Figure 15:
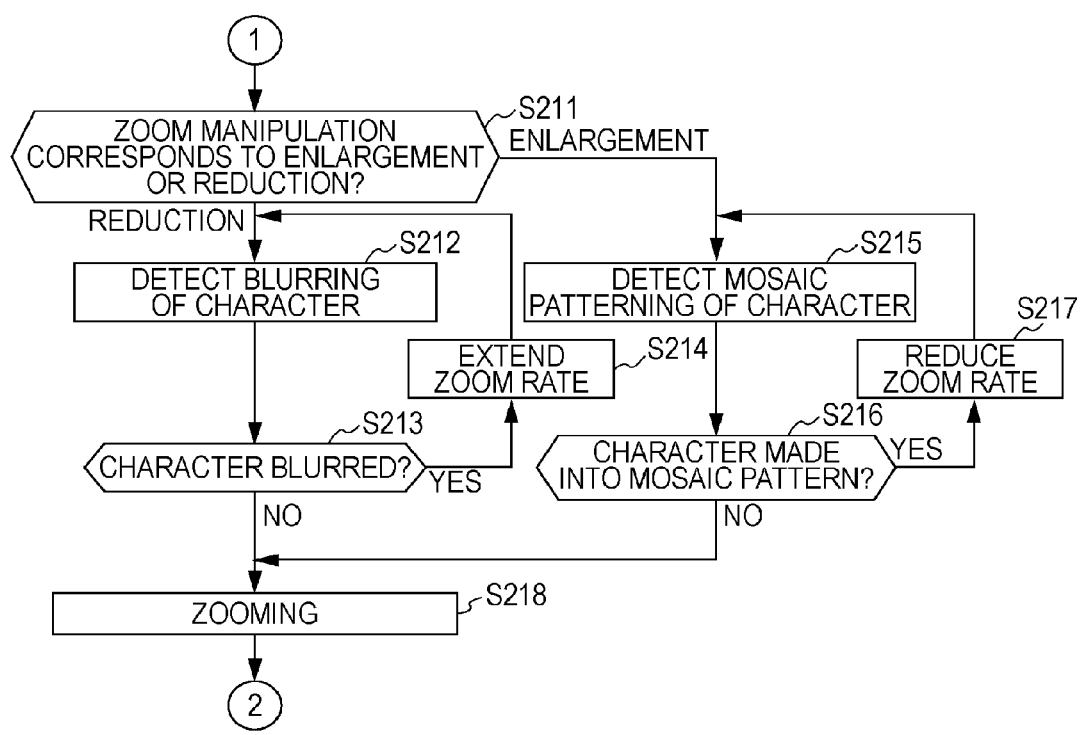
FIG. 15 is a flowchart illustrating the EPG display processing.

FIGS. 14 and 15 are flowcharts illustrating the EPG display processing. Hereinafter, with reference to FIGS. 14 and 15, the EPG display processing will be described.

In the case of manipulating the EPG, in order to set the pointing mode, a user performs the third gesture manipulation as shown in FIG. 10. If a remote control signal that corresponds to this gesture is received, the setting unit 202 sets the pointing mode in step S201. Accordingly, the user can designate an arbitrary object by the pointer.

In step S202, the determination unit 205 determines whether a program has been designated. That is, the user selects a program from a program table that is displayed by the pointer 301 by manipulating the input device 11. If the program has been designated, the execution unit 210 executes the processing that corresponds to the program in step S205. Specifically, the selected program is received, and is displayed on the display unit 54.

If the program has not been designated, the determination unit 205 determines whether the zoom point has been pointed in step S203. If the zoom point has not been pointed, the determination unit 205 determines whether a predetermined time has elapsed, i.e. whether a non-manipulation time has reached a predetermined time, in step S204. If the predetermined time has not elapsed, the processing returns to step S202, and the subsequent processing is repeated. When the predetermined time has elapsed, the processing is ended.

In the case of zooming in on the EPG, the user designates the zoom point by manipulating the input device 11. The zoom point is a reference point that prescribes the range to be zoomed in on. That is, the position of the reference to be zoomed in on in a screen of the display unit 54 on which the EPG is displayed is designated by the pointer. The designation of the zoom point means that the EPG is designated as the object. If the remote control signal that corresponds to the designation of the zoom point is received, the setting unit 202 sets the zoom point in step S206.

Then, the user performs the first gesture manipulation with the input device 11. If a remote control signal that corresponds to the first gesture is received, the setting unit 202 sets the zoom mode in step S207. At this time, the pointing mode is cancelled. Further, the user performs the second gesture manipulation as illustrated in FIG. 9. In step S208, the detection unit 203 detects the zoom manipulation based on the second gesture. In step S209, the operation unit 204 operates the zoom rate. That is, the zoom rate is operated based on the second gesture manipulation detected in step S208.

In step S210, the extraction unit 209 extracts a region of a virtual plane that corresponds to the zoom point. Hereinafter, with reference to FIGS. 16 to 21, the process of extracting the region of the virtual plane will be described.

Figure 16:
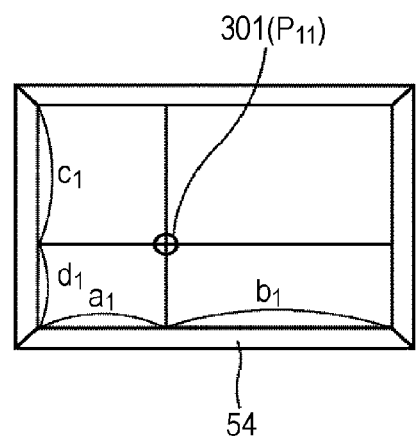
FIG. 16 is a diagram illustrating a zoom point.

FIG. 16 shows the zoom point. Although not illustrated for convenience in explanation, the EPG is displayed on the display unit 54. The zoom point $P_{11}$ is designated by the pointer 301. In FIG. 16, the position of the zoom point $P_{11}$ in a horizontal direction is a point at which the division ratio of a side in a horizontal direction of the display unit 54 is $a_1:b_1$. Also, the position of the zoom point $P_{11}$ in a vertical direction is a point at which the division ratio of a side in a vertical direction of the display unit 54 is $c_1:d_1$.

Figure 17:
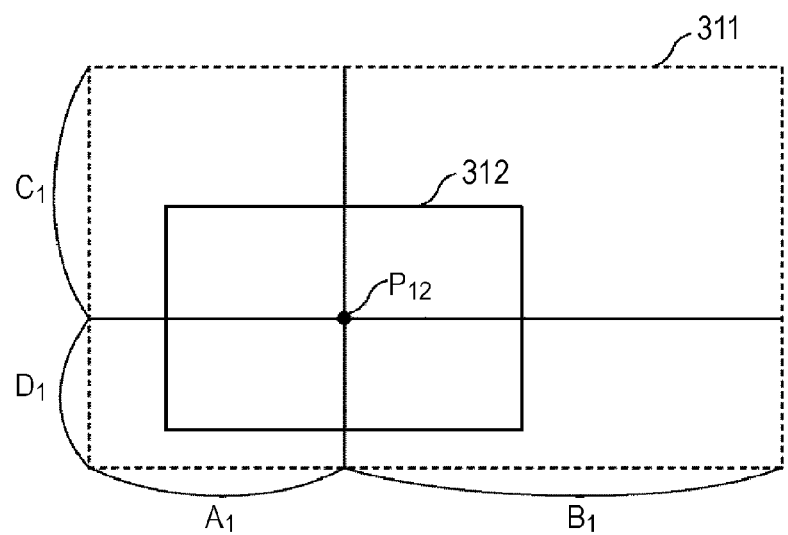
FIG. 17 is a diagram illustrating a virtual plane and a display range.

FIG. 17 shows the virtual plane and the extracted region. If the zoom point $P_{11}$ is designated as shown in FIG. 16, a predetermined region 312 is extracted from a virtual plane 311 as shown in FIG. 17. In FIG. 17, the virtual plane 311 indicates a range in which the EPG virtually exists, and the region 312 indicates a range that is displayed on the display unit 54 as a range on the basis of (in this case, around) a point $P_{12}$ on the virtual plane 311.

The point $P_{12}$ that is a virtual point on the virtual plane 311 is a point that corresponds to the zoom point $P_{22}$ on the display unit 54, and the region 312 is a region having a size that corresponds to the display unit 54 on the basis of the point $P_{12}$. As shown in FIG. 17, if it is assumed that the point $P_{12}$ is a point at which the division ratio of a side in a horizontal direction of the virtual plane 311 is $A_1:B_1$ and at which the division ratio of a side in a vertical direction of the virtual plane is $C_1:D_1$, the relations between the division ratios are set to $A_1:B_1=a_1:b_1$, and $C_1:D_1=c_1:d_1$. That is, the point $P_{12}$ on the virtual region 311 is a position that corresponds to the position of the zoom point $P_{11}$ on the display unit 54.

Figure 18:
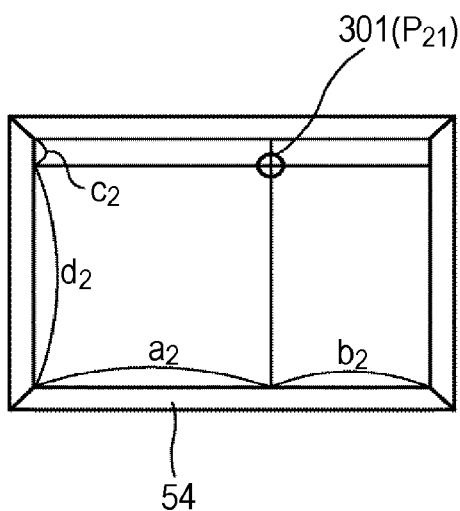
FIG. 18 is a diagram illustrating a zoom point.

FIG. 18 shows the zoom point. In an example illustrated in FIG. 18, the position of the zoom point $P_{21}$ in a horizontal direction is a point at which the division ratio of a side in a horizontal direction of the display unit 54 is $a_2:b_2$. Also, the position of the zoom point $P_{21}$ in a vertical direction is a point at which the division ratio of a side in a vertical direction of the display unit 54 is $c_2:d_2$.

Figure 19:
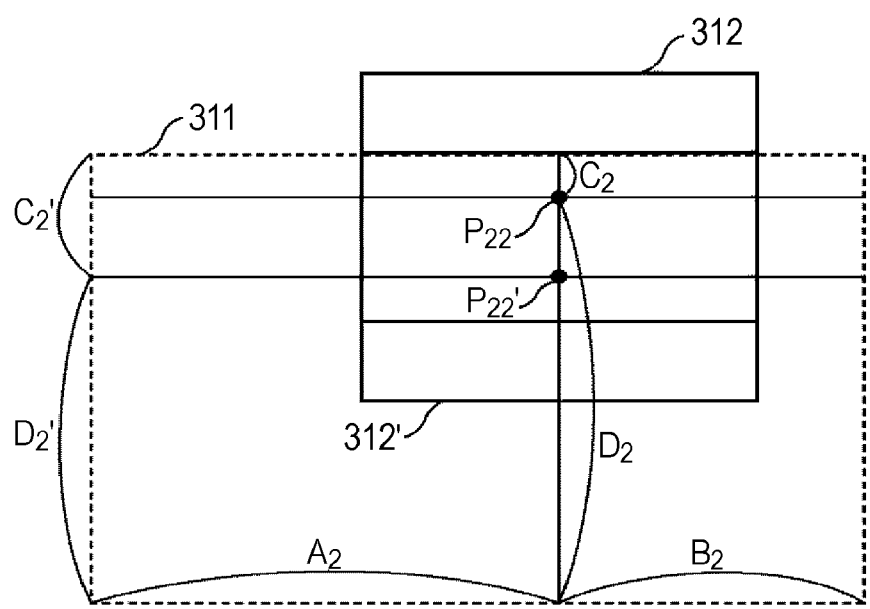
FIG. 19 is a diagram illustrating a virtual plane and a display range.

FIG. 19 shows the virtual plane and the extracted region. If the zoom point $P_{21}$ is designated as shown in FIG. 18, a region 312 that is based on a point $P_{22}$ corresponding to the zoom point $P_{21}$ is extracted from a virtual plane 311 as shown in FIG. 19. The point $P_{22}$ is a point at which the division ratio of a side in a horizontal direction of the virtual plane 311 is $A_2:B_2$ and at which the division ratio of a side in a vertical direction of the virtual plane is $C_2:D_2$. Also, the relations between the division ratios are set to $A_2:B_2=a_2:b_2$, and $C_2:D_2=c_2:d_2$.

However, as shown in FIG. 19, a part of the region 312 in the range that corresponds to the size of the display unit 54, which is around the point $P_{22}$, is projected to the outside of the virtual plane 311. No EPG exists on the outside of the virtual plane 311. Accordingly, a correction process is performed with respect to the position in a direction in which the point $P_{22}$ is projected to the outside so as to prevent the extracted region from being projected from the virtual plane 311.

That is, as shown in FIG. 19, the division ratio of a side in a vertical direction of the point $P_{22}$ is changed from $C_2:D_2$ to $C_2':D_2'$. As a result, the point $P_{22}$ is corrected to a point $P_{22}'$, and the extracted region 312 is corrected to a region 312' which has a size corresponding to the display unit 54 and which is around the point $P_{22}'$. Accordingly, a side (e.g. an upper side in FIG. 19) in a direction in which the region 312' is projected coincides with the upper side of the virtual plane 311, and thus the whole region 312' becomes a region inside the virtual plane 311.

Figure 20:
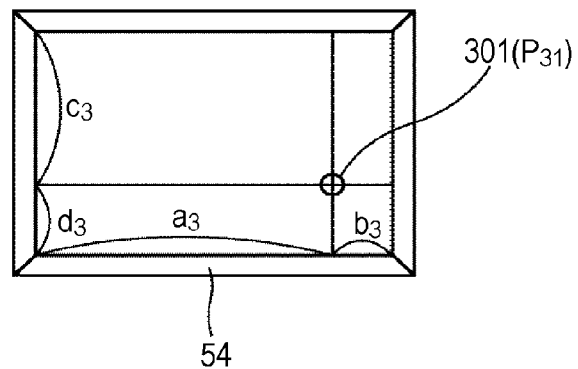
FIG. 20 is a diagram illustrating a zoom point.

FIG. 20 shows the zoom point. In an example as shown in FIG. 20, the position of the zoom point $P_{31}$ in a vertical direction is a point at which the division ratio of a side in a vertical direction of the display unit 54 is $c_3:d_3$. Also, the position of the zoom point $P_{31}$ in a horizontal direction is a point at which the division ratio of a side in a horizontal direction of the display unit 54 is $a_3:b_3$.

Figure 21:
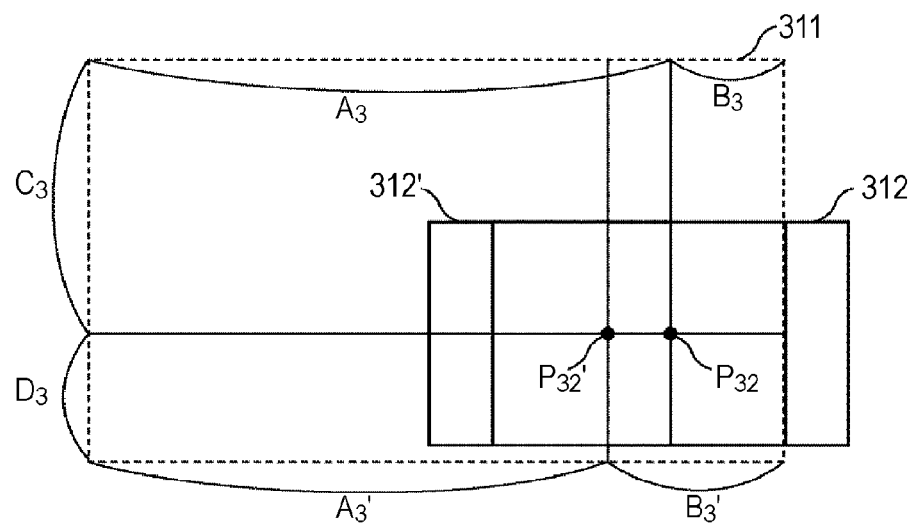
FIG. 21 is a diagram illustrating a virtual plane and a display range.

FIG. 21 shows the virtual plane and the extracted region. If the zoom point $P_{31}$ is designated as shown in FIG. 20, a region 312 that is around a point $P_{32}$ corresponding to the zoom point $P_{31}$ is extracted from a virtual plane 311 as shown in FIG. 21. The point $P_{32}$ is a point at which the division ratio of a side in a horizontal direction of the virtual plane 311 is $A_3:B_3$ and at which the division ratio of a side in a vertical direction of the virtual plane is $C_3:D_3$. Also, the relations between the division ratios are set to $A_3:B_3=a_3:b_3$, and $C_3:D_3=c_3:d_3$.

However, as shown in FIG. 21, a part of the region 312 in the range that corresponds to the size of the display unit 54, which is around the point $P_{32}$, is projected to the outside of the virtual plane 311. Accordingly, a correction process is performed with respect to the position in a direction in which the point $P_{32}$ is projected to the outside so as to prevent the extracted region from being projected from the virtual plane 311.

That is, as shown in FIG. 21, the division ratio of a side in a horizontal direction of the point $P_{32}$ is changed from $A_3:B_3$ to $A_3':B_3'$. As a result, the point $P_{32}$ is corrected to a point $P_{32}'$, and the extracted region 312 is corrected to a region 312' which has a size corresponding to the display unit 54 and which is around the point $P_{32}'$. Accordingly, a side (e.g. a right side in FIG. 19) in a direction in which the region 312' is projected coincides with the right side of the virtual plane 311, and thus the whole region 312' becomes a region inside the virtual plane 311.

If the region to be extracted is projected from two sides of the virtual plane 311, correction processes in respective directions are performed.

However, the EPG is displayed on the virtual plane 311, and due to its property, a block composed of a channel and a time zone is provided as a unit. Accordingly, it may be possible that a region in which an integer number of blocks are arrayed is extracted from at least one of channel and time axes.

Referring again to FIGS. 14 and 15, after the extraction of the region that corresponds to the zoom point is performed in step S210, the determination unit 205 determines which one of enlargement and reduction the zoom manipulation corresponds to in step S211. As described above, it is determined which direction between a backward direction and a depth direction the input device 11 has been moved in.

If the input device 11 has been moved backward, i.e. if reduction is instructed, the sensing unit 206 recognizes the display information and senses its defect in step S212. In this case, blurring of a character, which is the display information displayed on the object, is sensed.

In step S213, the determination unit 205 determines whether the character as the display information is blurred on the basis of the result of the sensing in step S212.

If it is determined that the character is blurred, the operation unit 204 increases the zoom rate in step S214. That is, if it is assumed that the size of the object when the object is reduced at the zoom rate $ZR_1$ operated in step S209 is $OS_1$, the zoom rate is changed to $ZR_2(=ZR_1+1)$ that is larger than $ZR_1$ by one step so that the object has a larger size $OS_2(>OS_1)$.

In step S212, the sensing unit 206 senses blurring of the character in the case in which the object is reduced at the zoom rate $ZR_2$ set in step S214. In step S213, the determination unit 205 determines whether the character is blurred on the basis of the result of the sensing in step S212.

By repeating the processing in steps S212 to S214, the zoom rate $ZR_A$ is obtained which is just less than that when the character is blurred. Once the zoom rate $ZR_A$ is obtained which is just less than that when the character is blurred, the zoom unit 207 zooms in on the designated object at the obtained zoom rate $ZR_A$ in step S218. As a result, the user can rapidly make the object into the minimum size in which the display information being displayed can be confirmed.

If it is determined that the zoom manipulation corresponding to the enlargement has been performed in step S211, i.e. if the input device 11 has been moved in a depth direction, the sensing unit 206 senses the defect of the display information in step S215. In this case, the mosaic patterning of the character as the display information that is displayed on the object is sensed.

In step S216, the determination unit 205 determines whether the character has been made into a mosaic pattern on the basis of the result of the sensing in step S215.

If it is determined that the character has been made into a mosaic pattern, the operation unit 204 reduces the zoom rate in step S217. That is, if it is assumed that the size of the object when the object is enlarged at the zoom rate $ZR_1$ operated in step S209 is $OS_3$, the zoom rate is changed to $ZR_3(=ZR_1-1)$ that is smaller than $ZR_1$ by one step so that the object has a smaller size $OS_4(<OS_3)$.

In step S215, the sensing unit 206 senses the defect of the display information in the case in which the object is enlarged at the zoom rate $ZR_3$ set in step S217. Specifically, the mosaic patterning of the character is sensed. In step S216, the determination unit 205 determines whether the character has been made into a mosaic pattern on the basis of the result of the sensing in step S215.

By repeating the processing in steps S215 to S217, the zoom rate $ZR_B$ is obtained which is just less than that when the character has been made into a mosaic pattern. Once the zoom rate $ZR_B$ is obtained which is just less than that when the character has been made into a mosaic pattern, the zoom unit 207 zooms in on the designated object at the obtained zoom rate $ZR_B$ in step S218. As a result, the user can rapidly make the object into the maximum size in which the character being displayed can be properly confirmed.

After the processing in step S218, the processing returns to step S202, and the subsequent processes are performed.

Figure 22:
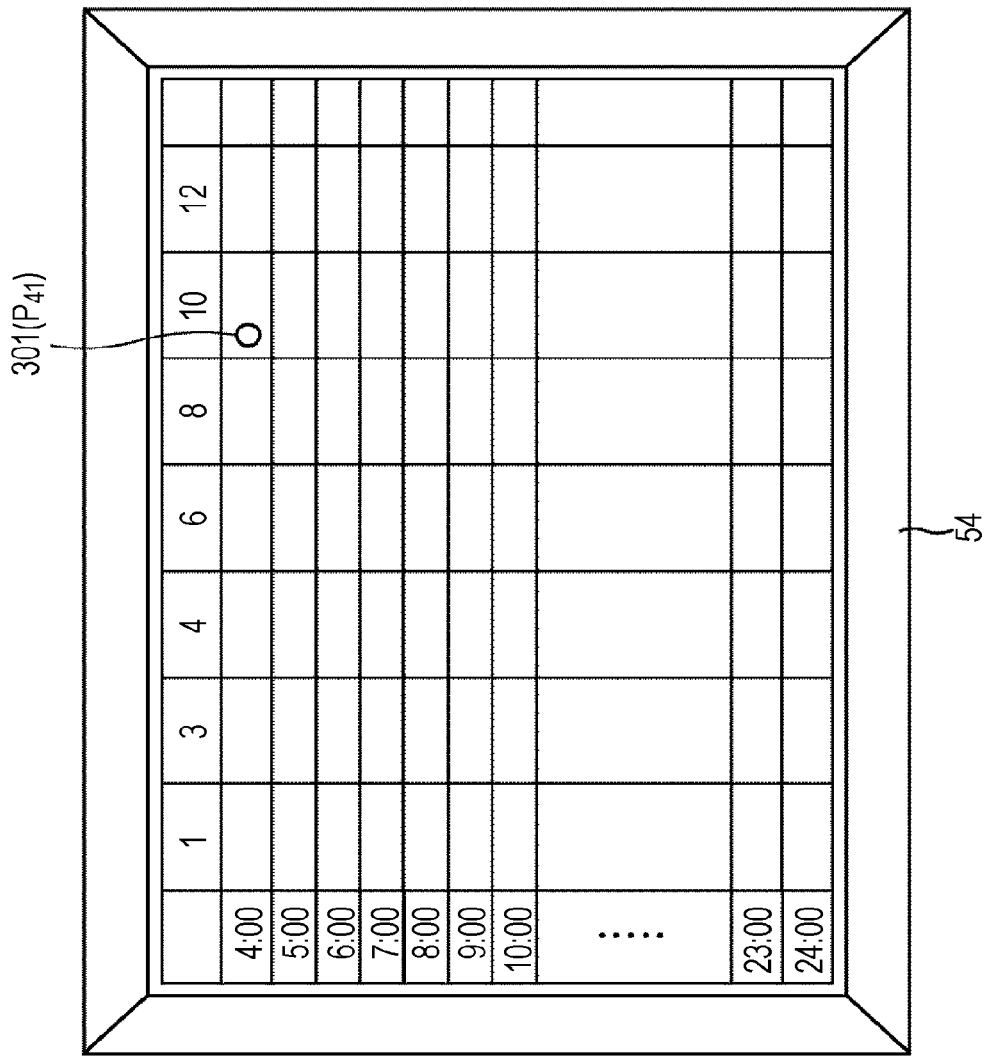
FIG. 22 is a diagram illustrating a display example.
Figure 23:
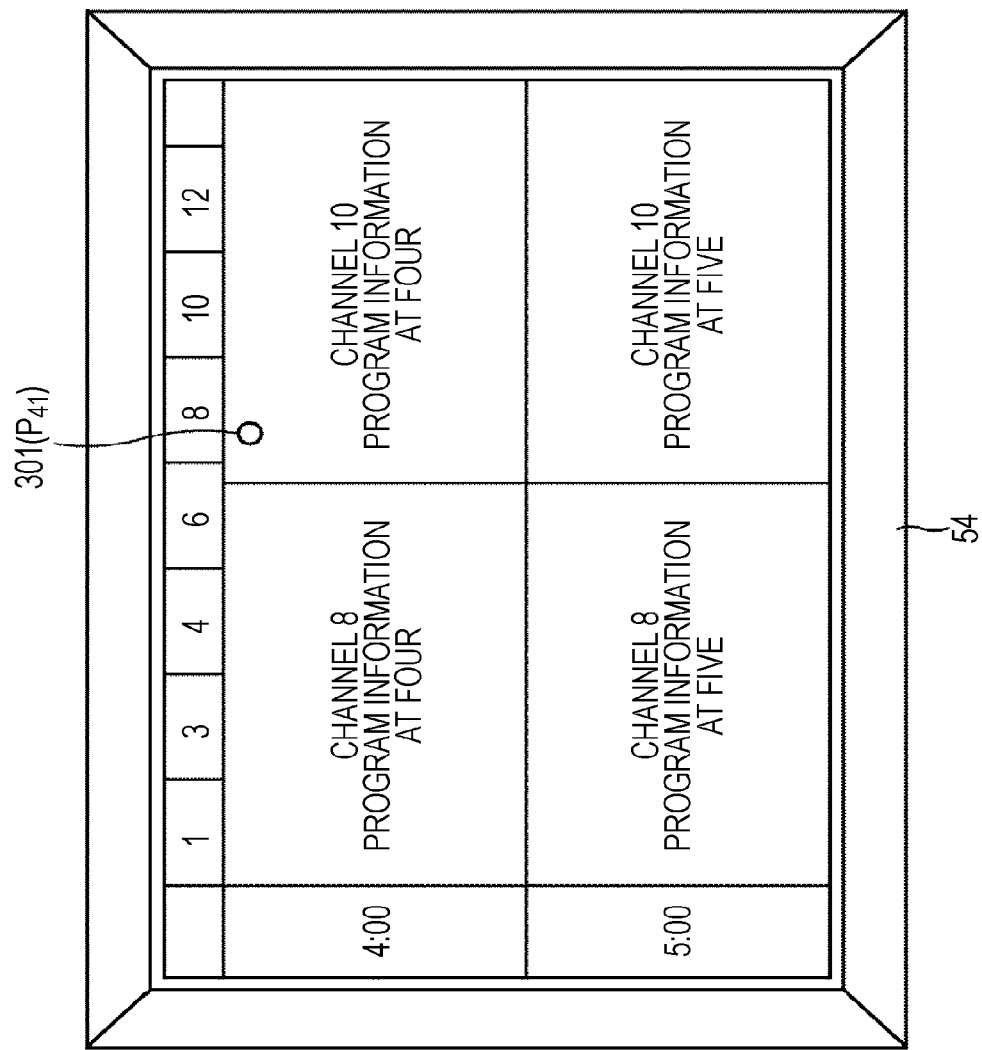
FIG. 23 is a diagram illustrating a display example.

FIG. 22 shows a display example of EPG before zooming, and FIG. 23 shows a display example of EPG after zooming.

As shown in FIG. 22, the EPG is displayed on the display unit 54. On an upper side of the screen, in a horizontal direction, television broadcasting channel numbers 1, 3, 4, 6, 8, 10, 12 are displayed. On the left side of the screen, in a vertical direction, time zones 4:00, 5:00, 6:00, . . . , 23:00, 24:00 are displayed. Although not illustrated in the drawing, in each time zone of each channel, information of the corresponding programs, such as a title or the like, is displayed.

In FIG. 22, a point at which the pointer 301 is positioned is designated as a zoom point $P_{41}$. The zoom point $P_{41}$ is positioned on the left side of a block designated by a channel 10 and a time zone of 4:00. In this state, if a predetermined amount of zoom manipulation (e.g. enlargement manipulation) is performed, as shown in FIG. 23, blocks designated by time zones of 4:00 to 5:00 and channels 8 and 10, respectively, are enlarged and displayed. That is, information on a program that is broadcast at channel 8 in a time zone of 4:00 and information on a program that is broadcast at channel 10 in a time zone of 4:00 are displayed. In addition, information on a program that is broadcast at channel 8 in a time zone of 5:00 and information on a program that is broadcast at channel 10 in a time zone of 5:00 are displayed.

In the embodiment of the present invention, on both axes of channel and time zone, an integer number of blocks are arranged to be displayed. However, the display range of channels is not enlarged, and thus all channel numbers 1, 3, 4, 6, 8, 10, 12 are displayed. By contrast, the display range of time zones is enlarged, and thus only figures in the time zones of 4:00 and 5:00 are displayed rather than all the time zones.

Figure 24:
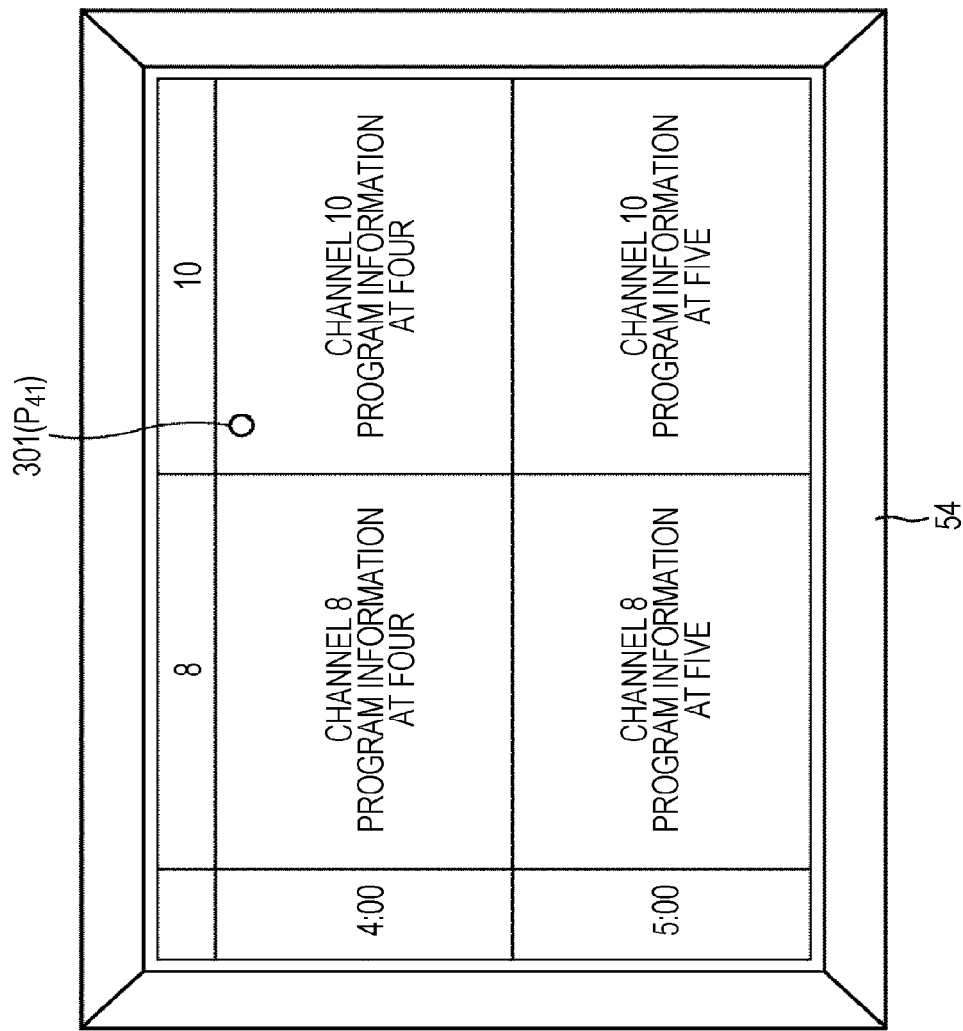
FIG. 24 is a diagram illustrating a display example.

FIG. 24 shows a display example of EPG after zooming. In FIG. 24, not only the display range of time zones but also the display range of channels are enlarged. That is, as the display range of the time zones, only figures in the time zones of 4:00 and 5:00, rather than in all the time zones, are displayed. Also, as the display range of channels, only figures of channels 8 and 10, rather than all the channels, are displayed.

As described above, by enlarging the displayed information, a user can accurately confirm the program information.

Figure 25:
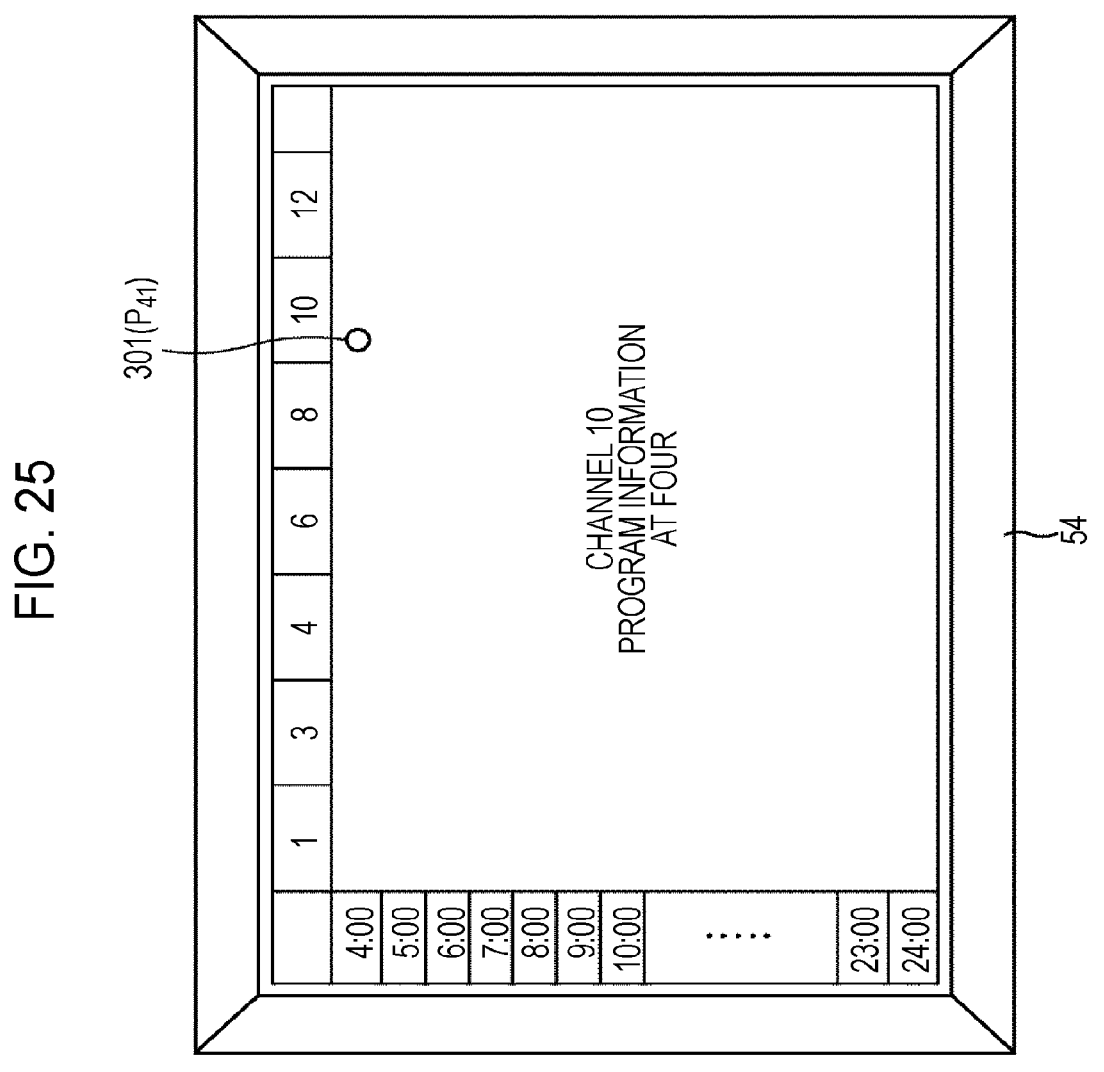

FIG. 25 shows a display example of EPG after zooming. If an amount of zoom manipulation is larger than that in the state as illustrated in FIG. 22, i.e. if a manipulation for enlarging the displayed information is performed, as shown in FIG. 25, only program information of one block at channel 10 in a time zone of 4:00 is displayed.

However, if the displayed character is blurred as shown in FIG. 22 in a state in which blurring of the display information is prohibited, a narrower range of channels and time zones is displayed. Also, if the displayed character has been made into a mosaic pattern as shown in FIG. 25 in a state in which the mosaic patterning of the display information is prohibited, a wider range of channels and time zones is displayed as shown in FIG. 23 or 24.

[Modifications]

In the above-described embodiments, a television receiver has been considered as the image display apparatus 12. However, it is also possible to apply the present invention to a personal computer or other information processing apparatuses.

The series of processing described above may be executed by hardware or software. In the case of executing the series of processing using software, a program included in the software is installed in a computer provided in dedicated hardware or installed in a general-purpose personal computer, which is capable of executing various kinds of functions when various programs are installed.

Also, a program executed by a computer may be a program that performs processing in a time-series manner according to the order as described above or may be a program that performs processing in parallel or separately at any timing when such processing is necessary, for example, in response to a calling by a user.

In addition, in this specification, the system indicates the entire apparatus formed by a plurality of devices.

Also, the present invention is not limited to the above-described embodiments, and diverse modifications can be made without departing from the scope of the invention.

The present application contains subject matter related to that disclosed in Japanese Priority Patent Application JP 2009-103828 filed in the Japan Patent Office on Apr. 22, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing system comprising:
    a detection unit operable to detect user input comprising gestures in three-dimensional space; and
    an operation unit operable to:
        set one of a plurality of modes in accordance with user input detected by the detection unit, the plurality of modes comprising a zoom mode and a pointing mode,
        if the set mode is the pointing mode, designate an object based at least in part on user input detected by the detection unit,
        if the set mode is the zoom mode, define a zoom rate for zooming an object based at least in part on user input detected by the detection unit,
        determine whether the defined zoom rate causes at least part of the object to be blurred,
        zoom the object at a larger zoom rate that is larger than the defined zoom rate, and cause the object to be displayed at the larger zoom rate, if it is determined that the defined zoom rate causes at least part of the object to be blurred, and
        zoom the object at the defined zoom rate and cause the object to be displayed at the defined zoom rate, if it is determined that the defined zoom rate does not cause at least part of the object to be blurred.

2. The information processing system of claim 1, wherein the determination whether the defined zoom rate causes at least part of the object to be blurred is based on at least one of a number of strokes of a character of the object, an amount of space between lines of the object, and a distance of a contour of the object.

3. The information processing system of claim 2, wherein the object comprises an image of a face, the distance of the contour of the object comprises a distance of a contour of a predetermined region of the face, and the predetermined region of the face comprises a mouth region or a nose region.

4. The information processing system of claim 1, wherein the larger zoom rate is determined by recognizing a character, a figure, or a face that is displayed on the object.

5. The information processing system of claim 1, wherein the zoom unit zooms a predetermined range based at least in part on a virtual point on a virtual plane to which a reference point designated via user input corresponds.

6. The information processing system of claim 5, wherein if end portions in upward, downward, left, and right directions of an enlarged range are positioned out of the virtual plane when the predetermined range around the virtual point is enlarged, the position of the virtual point in the virtual plane is corrected so that an image in the virtual plane is enlarged.

7. The information processing system of claim 1, wherein the user input which the detection unit is operable to detect is represented by a remote control signal generated by an input device in response to the input device being manipulated by the user via gestures in three-dimensional space.

8. The information processing system of claim 1, wherein the detection unit is operable to detect user input comprising hand gestures in three-dimensional space.

9. The information processing system of claim 1, wherein the operation unit is operable to enable a user to specify whether blurring of the object is permitted.

10. The information processing system of claim 9, wherein the operation unit is operable to: zoom the object at a larger zoom rate that is just larger than the defined zoom rate and cause the object to be displayed at the larger zoom rate if it is determined that the defined zoom rate causes at least part of the object to be blurred, and the user specifies that blurring of the object is not permitted; and
    zoom the object at the defined zoom rate and cause the object to be displayed at the defined zoom rate if it is determined that the defined zoom rate does not causes at least part of the object to be blurred, or if the user specifies via the display condition unit that blurring of the object is permitted.

11. An information processing method comprising acts, performed by an information processing apparatus, of:
    enabling a user to select from of a plurality of modes via input comprising one or more gestures in three-dimensional space, the plurality of modes comprising a zoom mode and a pointing mode;
    in response to the user selecting the pointing mode, enabling the user to designate an object via input comprising one or more gestures in three-dimensional space;
    in response to the user selecting the zoom mode:
        enabling the user to define a zoom rate for zooming an object via input comprising one or more gestures in three-dimensional space;
        determining whether the defined zoom rate causes at least part of the object to be blurred;
        zooming the object at a larger zoom rate that is larger than the defined zoom rate, and causing the object to be displayed at the larger zoom rate, if it is determined that the defined zoom rate causes at least part of the object to be blurred; and
        zooming the object at the defined zoom rate, and causing the object to be displayed at the defined zoom rate, if it is determined that the value defined zoom rate does not cause at least part of the object to be blurred.

12. The information processing method of claim 11, wherein the determination whether the defined zoom rate causes at least part of the object to be blurred is based on at least one of a number of strokes of a character of the object, an amount of space between lines of the object, and a distance of a contour of the object.

13. The information processing method of claim 12, wherein the object comprises an image of a face, the distance of the contour of the object comprises a distance of a contour of a predetermined region of the face, and the predetermined region of the face comprises a mouth region or a nose region.

14. The information processing method of claim 11, wherein the larger zoom rate is determined by recognizing a character, a figure, or a face that is displayed on the object.

15. The information processing method of claim 11, wherein zooming the object comprises zooming a predetermined range based at least in part on a virtual point on a virtual plane to which a reference point designated via user input corresponds.

16. The information processing method of claim 15, wherein if end portions in upward, downward, left, and right directions of an enlarged range are positioned out of the virtual plane when the predetermined range around the virtual point is enlarged, the position of the virtual point in the virtual plane is corrected so that an image in the virtual plane is enlarged.

17. The information processing method of claim 11, wherein the user input comprising one or more gestures in three-dimensional space is represented by a remote control signal generated by an input device in response to the input device being manipulated by the user via the one or more gestures in three-dimensional space.

18. The information processing method of claim 11, wherein the user input comprising one or more gestures in three-dimensional space comprises one or more hand gestures in three-dimensional space.

19. The information processing method of claim 11, comprising an act of enabling the user to specify whether blurring of the object is permitted.

20. A non-transitory computer-readable storage medium having instructions recorded thereon which, when executed, perform a method comprising:
  enabling a user to select from of a plurality of modes via input comprising one or more gestures in three-dimensional space, the plurality of modes comprising a zoom mode and a pointing mode;
  in response to the user selecting the pointing mode, enabling the user to designate an object via input comprising one or more gestures in three-dimensional space;
  in response to the user selecting the zoom mode:
    enabling the user to define a zoom rate for zooming an object via input comprising one or more gestures in three-dimensional space;
    determining whether the defined zoom rate causes at least part of the object to be blurred;
    zooming the object at a larger zoom rate that is larger than the defined zoom rate, and causing the object to be displayed at the larger zoom rate, if it is determined that the defined zoom rate causes at least part of the object to be blurred; and
    zooming the object at the defined zoom rate, and causing the object to be displayed at the defined zoom rate, if it is determined that the value defined zoom rate does not cause at least part of the object to be blurred.

* * * * *